United States Patent
Segawa et al.

(10) Patent No.: US 8,404,002 B2
(45) Date of Patent: Mar. 26, 2013

(54) BIPOLAR BATTERY AND METHOD OF MANUFACTURING SAME

(75) Inventors: Teruo Segawa, Ayase (JP); Hajime Sato, Yokohama (JP); Kenji Hosaka, Yokosuka (JP); Gen Takayama, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 918 days.

(21) Appl. No.: 12/375,569

(22) PCT Filed: Nov. 22, 2007

(86) PCT No.: PCT/IB2007/003669
§ 371 (c)(1),
(2), (4) Date: Jan. 29, 2009

(87) PCT Pub. No.: WO2008/068570
PCT Pub. Date: Jun. 12, 2008

(65) Prior Publication Data
US 2009/0253038 A1     Oct. 8, 2009

(30) Foreign Application Priority Data

Dec. 8, 2006   (JP) .................................. 2006-332344
Aug. 1, 2007   (JP) .................................. 2007-201171

(51) Int. Cl.
*H01M 4/82* (2006.01)
(52) U.S. Cl. .............................. 29/623.1; 29/2; 29/623.5
(58) Field of Classification Search ................. 26/623.1; 29/623.1
See application file for complete search history.

(56) References Cited

U.S. PATENT DOCUMENTS

| 3,862,862 A * | 1/1975 | Gillibrand et al. ............... 427/58 |
| 6,419,712 B1 * | 7/2002 | Haverstick .................... 29/623.5 |
| 6,468,690 B1 * | 10/2002 | Barker et al. ................. 429/162 |
| 6,887,620 B2 * | 5/2005 | Klein et al. .................... 429/210 |
| 2005/0260493 A1 * | 11/2005 | Frederiksson et al. ........ 429/210 |
| 2006/0115718 A1 | 6/2006 | Parsian et al. |
| 2007/0240300 A1 * | 10/2007 | Hasei .......................... 29/623.5 |

FOREIGN PATENT DOCUMENTS

| EP | 1 418 638 A2 | 5/2004 |
| EP | 1 487 034 A2 | 12/2004 |
| JP | Hei. 11-204136 | 7/1999 |
| JP | 11-312514 | 11/1999 |
| JP | 2008-159569 | 7/2008 |
| KR | 2004-0107372 A | 12/2004 |

\* cited by examiner

*Primary Examiner* — Joseph S Del Sole
*Assistant Examiner* — David N Brown, II
(74) *Attorney, Agent, or Firm* — Young Basile

(57) ABSTRACT

An apparatus and a method for manufacturing a bipolar battery are disclosed, which are capable of restraining the introduction of a bubble, resulting in superior battery performance. A bipolar battery is disclosed for preparing an electrolyte layer, which includes permeable separators such that the electrolytes can penetrate therein and a bipolar electrode wherein a cathode is formed at one side of a collector and an anode is formed at another side of the collector. Then, the electrolyte layers are stacked upon one another. When the electrolyte layer is provided to the bipolar electrode, bubbles within the electrolyte layer are exhausted from one side to another side of the separator via the separator.

14 Claims, 38 Drawing Sheets

Forming an assembly unit

Forming a bonded body

Casing

Assembly unit

Stacking

Pressing

Forming a sealing layer

Forming an interface

Initial charging

Exhausting a gas

Integrated stack

502

BIPOLAR BATTERY AND METHOD OF MANUFACTURING SAME

CROSS-REFERENCE TO RELATED APPLICATIONS

This application claims priority from Japanese Patent Application Ser. No. 2006-332344, filed Dec. 8, 2006, and No. 2007-201171, filed Aug. 1, 2007, each of which is incorporated herein in its entirety by reference.

TECHNICAL FIELD

The present invention relates to a bipolar battery and a method of manufacturing the same.

BACKGROUND

Generally, a bipolar battery has a structure in which an electrolyte layer is provided in a bipolar electrode, wherein a cathode is formed at one side of a collector and an anode is formed at another side of the collector. Further, in such a structure, the electrolyte layers are stacked upon one another.

BRIEF SUMMARY

Taught herein is a bipolar battery having superior battery performance due to improved power density through removing air bubbles from the battery. Also taught are a method and apparatus for manufacturing said bipolar battery.

One embodiment of the bipolar battery comprises an electrolyte layer and a bipolar electrode having a cathode formed on one side of a collector and an anode formed on an opposite side of the collector, the cathode and anode surfaced with an electrolyte on a side opposite the collector. The electrolyte layer is formed when the electrolyte surface of the bipolar electrode is contacted with a permeable separator and a portion of the electrolyte permeates the separator. The bubble generated during contact with the separator is exhausted from the battery.

A method of manufacturing a bipolar battery taught herein comprises the step of exhausting a bubble formed within said electrolyte layer through a permeable separator provided in the electrolyte layer. Forming the electrolyte layer comprises suctioning and retaining one side surface of the separator with a separator suction portion, retaining the bipolar electrode on a conveyer, with the bipolar electrode configured with the electrolyte surface facing up, and overlapping a side surface of the separator opposite the separator suction portion with the electrolyte surface. Exhausting the bubble comprises exerting a negative pressure with a suction device that provides suction to the separator suction portion on the separator while overlapping.

An embodiment of an apparatus for manufacturing the bipolar battery comprises a bubble exhausting mechanism for exhausting the bubble through the separator when forming the electrolyte layer. The bubble exhausting mechanism comprises a separator retaining plate for retaining the separator, and the separate retaining plate is permeable so that the bubble exhausted through the separator is exhausted to an outside.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In Japanese Laid-Open Patent Publication No. (Hei.) 11-204136, the collector of the bipolar battery has the cathode, anode and electrolyte layers. The electrolyte layer is a layer into which the electrolyte is impregnated, further segmenting the cathode and the anode, or a layer of electrolyte between the cathode or anode and the separator. However, when providing the electrolyte, a bubble is introduced and maintained in the electrolyte between the cathode or anode and the separator.

Specifically, the bubble occurs when the separator is overlapped with the electrolyte layer in contact with the cathode or anode. A corrugation is formed on the separator, thereby forming a micro-gap in the electrolyte layer. When the bubble remains when the layers are stacked as described above, a dead space is generated wherein an ion cannot be permeated and an electron cannot be moved. The dead space is a factor for the deterioration of power. This can be a significant problem when trying to improve the power density.

Embodiments according to the invention, explained with reference to the drawings, minimize or eliminate such bubbles.

Figure 1:
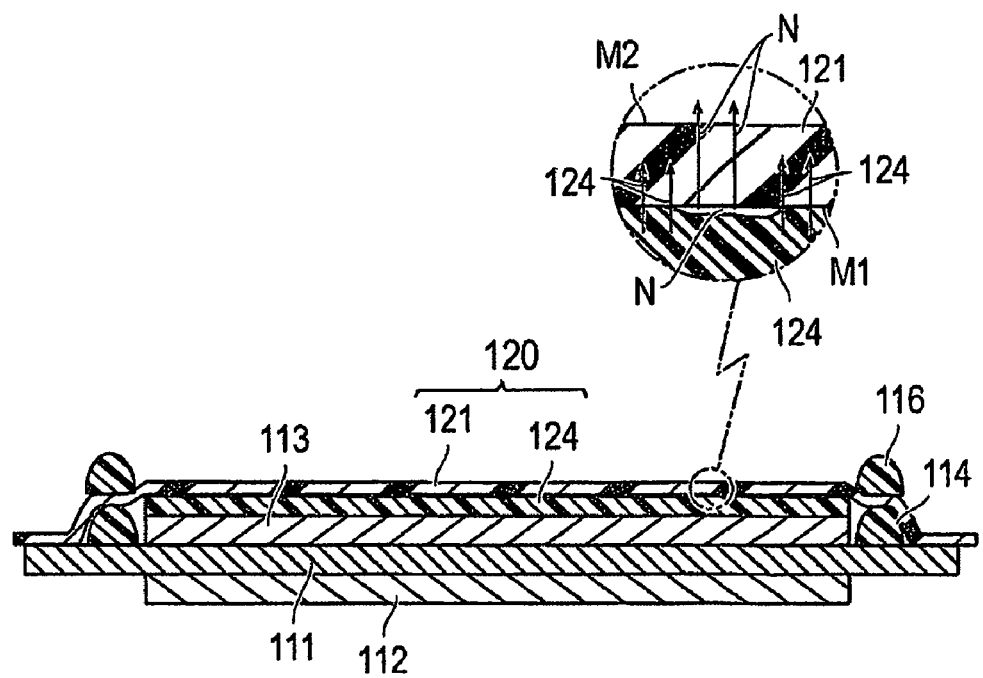
FIG. 1 is a cross-sectional view illustrating exhausting a bubble N between a separator and an electrolyte layer using a method of manufacturing a bipolar battery in accordance with an embodiment of the invention.
Figure 2:
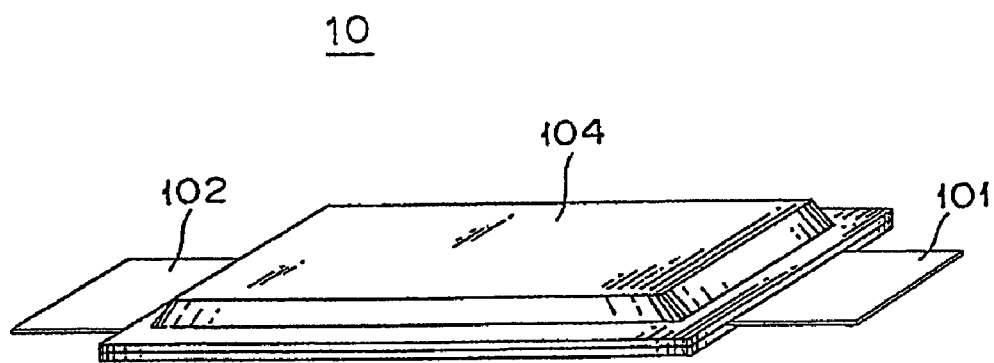
FIG. 2 is a perspective view illustrating a bipolar battery manufactured with a method of manufacturing the bipolar battery in accordance with an embodiment of the invention.
Figure 3:
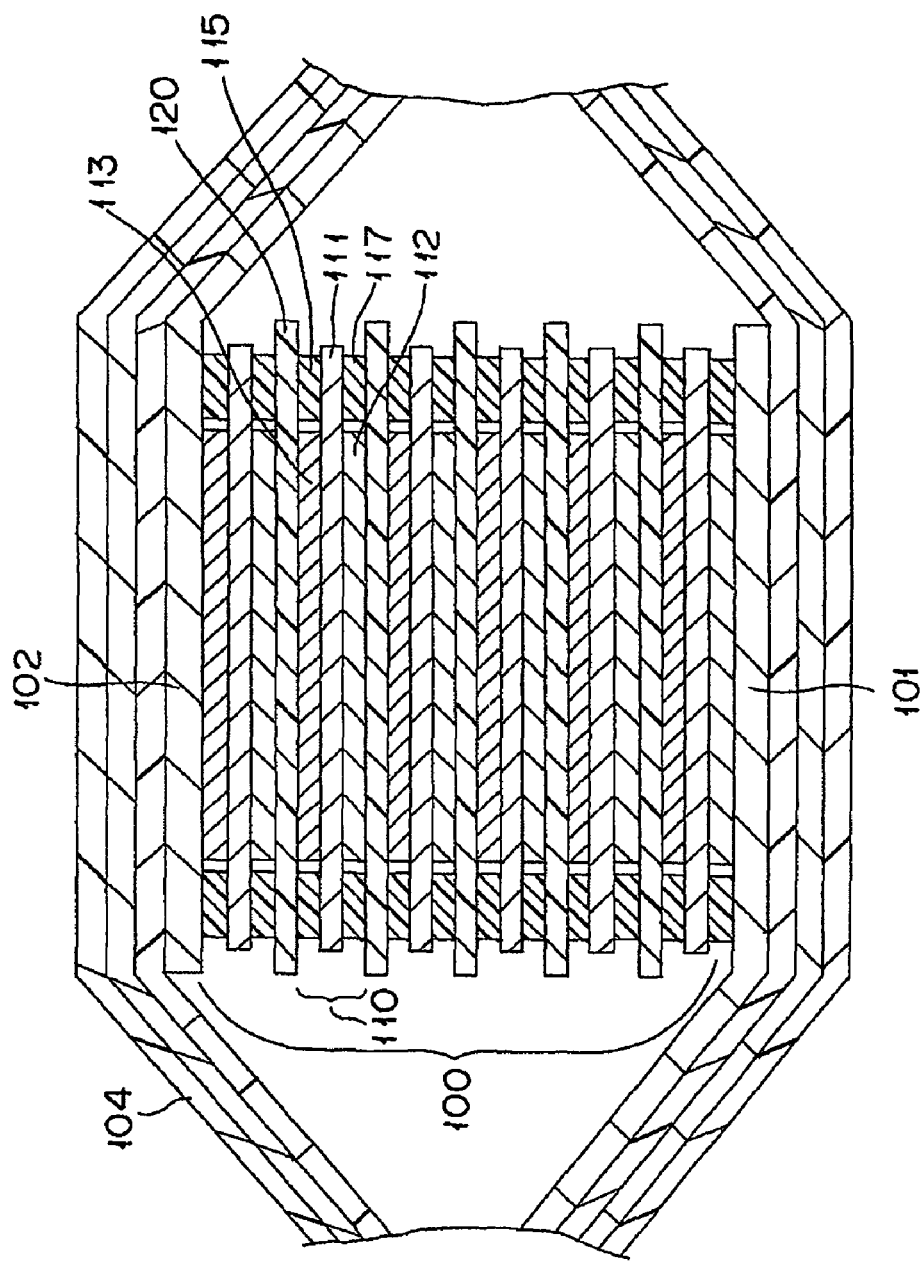
FIG. 3 is a cross-sectional view illustrating the bipolar battery.
Figure 4:
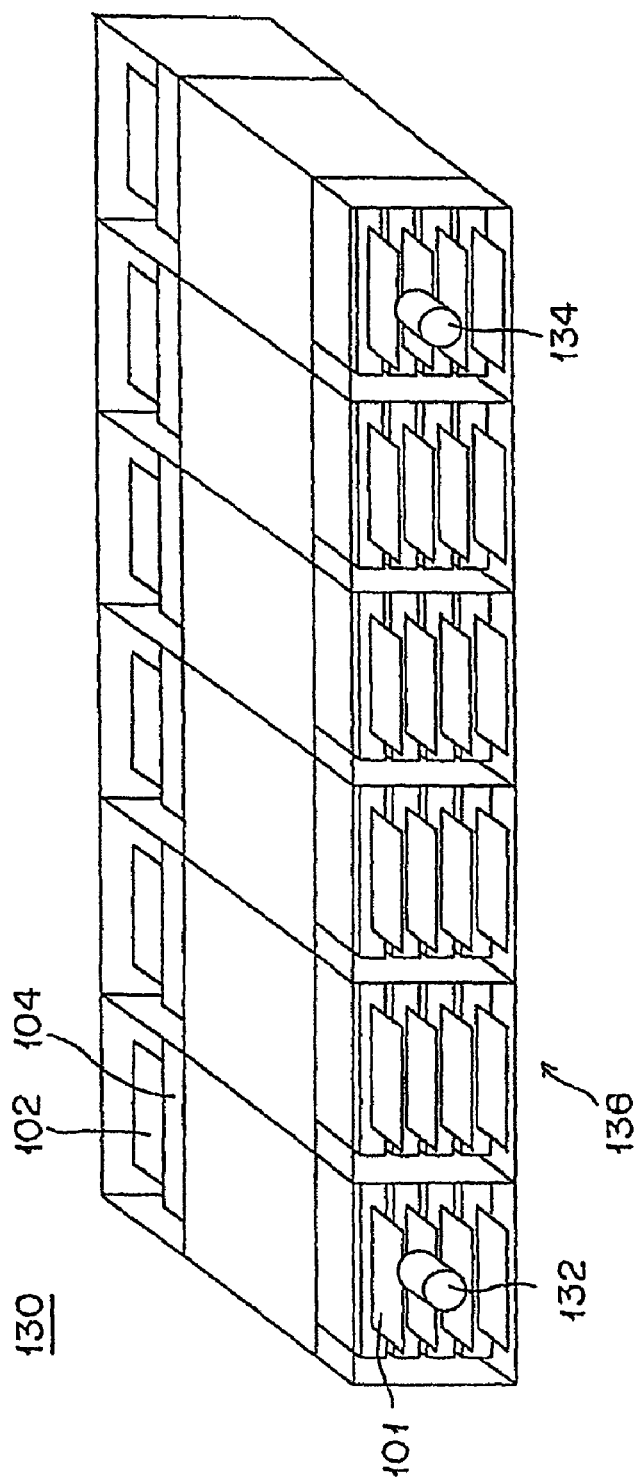
FIG. 4 is a perspective view illustrating a battery assembly using the bipolar battery shown in FIG. 2.
Figure 5:
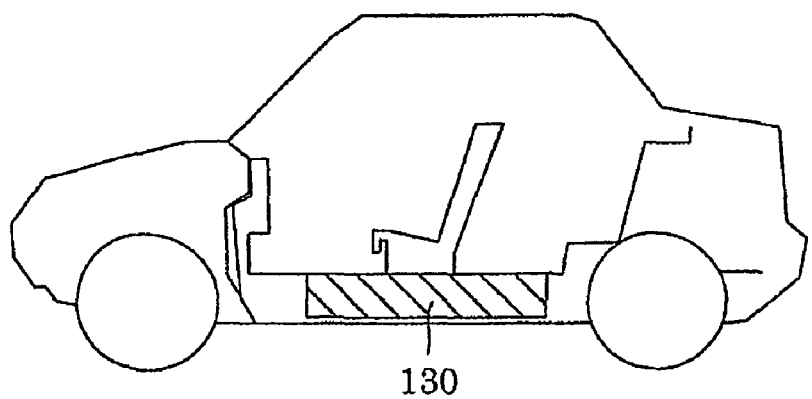
FIG. 5 is a schematic view of a vehicle wherein the battery assembly shown in FIG. 4 is mounted.

FIG. 1 is a cross-sectional view illustrating an exhaustion of a bubble within an electrolyte layer in a method of manufacturing a bipolar battery in accordance with an embodiment of the invention. FIG. 2 is a perspective view illustrating a bipolar battery manufactured using a method of manufacturing the bipolar battery in accordance with an embodiment of the invention. FIG. 3 is a cross-sectional view illustrating the bipolar battery shown in FIG. 2. FIG. 4 is a perspective view illustrating a battery assembly using the bipolar battery shown in FIG. 2. FIG. 5 is a diagram of a vehicle wherein the battery assembly shown in FIG. 4 is mounted.

A bipolar battery 10 manufactured using a method of manufacturing disclosed herein is, for example, a lithium secondary battery. As shown in FIG. 3, the bipolar battery 10 comprises a bipolar electrode 110 having a cathode 113, an anode 112 and a collector 111. The bipolar battery 10 also includes an electrolyte layer 120, a first sealing layer (charging portion) 115 and a second sealing layer (charging portion) 117. The cathode 113 is formed at one side surface of the collector 111. The anode 112 is formed at the other side surface of the collector 111. That is, the collector 111 is placed between the cathode 113 and the anode 112.

The first sealing layer 115 is arranged on the same side surface of the collector 111 as the cathode and extended to surround the cathode 113. The electrolyte layer 120 is arranged to cover the cathode 113 and the first sealing layer 115. The second sealing layer 117 is position-adjusted with the first sealing layer 115, thereby being arranged on the same side surface of the collector 111 as the anode 112 and extended to surround the anode 112.

The electrolyte layer 120 has a layer wherein a gel polymer electrolyte penetrates into a porous separator 121 with permeability for segmenting the cathode and the anode as shown in FIG. 1. The electrolyte layer 120 also has a layer of the electrolyte 124 for conducting an ion between the separator 121 and the cathode 113 or the anode 112.

The collector 111 is, for example, a stainless steel foil. However, the collector 111 is certainly not limited thereto since it may include an aluminum foil, a clad material of nickel and aluminum, a clad material of copper and aluminum, or a plating material of a combination of the above metals.

An anode active material of the anode 112 is, for example, a hard carbon (a non-graphitized carbon material). However, the anode active material is certainly not limited thereto since it may include a graphite-based carbon material or a lithium-transition metallic composite oxide. An anode active material composed of carbon and the lithium-transition metallic composite oxide provides optimum capacity and power.

A cathode active material of the cathode 113 is, for example, $LiMn_2O_4$, although it is certainly not limited thereto. The lithium-transition metallic composite oxide provides optimum capacity and power.

Thicknesses of the cathode 113 and the anode 112 are certainly not limited. That is, these thicknesses may be set depending on the purpose of use, such as emphasizing power or energy or emphasizing ion conductivity.

A sealing material constituting the first and second sealing layers 115 and 117 shown in FIG. 3 is, for example, one-liquid uncured epoxy resin. However, the sealing material is certainly not limited thereto since it may include other thermosetting resins such as, for example, polypropylene or polyethylene or thermoplastic resins. Selection of a sealing material may be based on the type of application.

A material of the separator 121, which is a part of the electrolyte layer 120, is PE (polyethylene) having porosity or permeability. However, it is certainly not limited thereto since it may include, for example, other polyolefins such as PP (polypropylene), a stack in a three-layer structure of PP/PE/PP, polyamide, polyimide, aramide or non-woven fabric. The non-woven fabrics may include, for example, cotton, rayon, acetate, nylon and polyester. The separator 121 is an insulator for segmenting the cathode and the anode. However, since the electrolyte penetrates into numerous apertures of the separator 121, the ion and current can flow.

An electrolytic solution of the electrolyte includes, for example, an organic solvent composed of PC (propylene carbonate) and BC (ethylene carbonate) and includes lithium salt ($LiPF_6$) as a support salt. The organic solvent is certainly not limited to PC and EC since it may include other ring-type carbonate classes, chain-type carbonate classes such as dimethylcarbonate and ether classes such as tetrahydrofuran. The lithium salt is also not limited to $LiPF_6$ since it may include other inorganic anionic salts and organic anionic salts such as $LiCF_3SO_3$.

A host polymer of the electrolyte is, for example, PVDF-HFP (copolymer of polyvinylidene fluoride and hexafluoropropylene) containing 10% of HFP (hexafluoropropylene) copolymer. However, the host polymer is certainly not limited thereto since it may include other polymers without lithium ion conductivity or polymer (solid polymer electrolyte) with ion conductivity. The other polymers without lithium ion conductivity, for example, include PAN (polyacrylonitile) and PMMA (polymethylmethacrylate). The polymer with ion conductivity, for example, is PEO (polyethylene oxide) or PPO (polypropylene oxide).

The bipolar battery 10 shown in FIG. 2 is housed within an exterior case 104 in the form of a stack 100 of unit batteries, as shown in FIG. 3. The exterior case 104 serves to prevent an impact from the outside or environmental deterioration. Terminal plates 101 and 102 are arranged, respectively, at outermost (uppermost and lowermost) layers of the stack 100. Further, a reinforcing plate may be arranged at a further outer side of the terminal plates 101 and 102.

The terminal plates 101 and 102 are composed of a high conductive member and configured to cover at least the entire electrode projection surface of the outermost layer of the stack 100. Therefore, a current extracting portion of the outermost layer acquires a low resistance, thereby reducing the resistance in the current extracting portion along a surface direction. Accordingly, it is possible to obtain the battery with a higher power. The high conductive member includes, for example, aluminum, copper, titan, nickel, stainless or alloys thereof.

The terminal plates 101 and 102 are extended to an outer portion of the exterior case 104 and serve as an electrode tab for extracting the current from the stack 100. By arranging an electrode tab of an independent separate member and connecting to the terminal plates 101 and 102 directly or by using a lead, it is possible to extract the current from the stack 100. It is also possible to constitute the terminal plates 101 and 102 with the collector 111 placed at an outermost layer of the stack 100.

To reduce weight and thermal conductivity, the exterior case 104 is composed of a sheet material such as polymer-metallic composite laminate film wherein metals such as aluminum, stainless, nickel and copper (including alloy thereof) are coated by an insulator such as a polypropylene film. Further, the exterior case 104 is formed by bonding a part or entire outer periphery of the case via thermal fusion.

It is possible to use the exterior case 104 independently Optionally, for example, it is possible to use the exterior case 104 in the form of a battery assembly 136 as shown in FIG. 4. The battery assembly 136 constitutes serializing and/or parallelizing the exterior case 104 and multi-connecting the exterior cases 104. The battery assembly 136 has conductive bars 132 and 134. The conductive bars 132 and 134 are connected to the terminal plates 101 and 102 extended from an inner portion of the exterior case 104.

When the exterior cases 104 are connected, the capacity and voltage can be freely adjusted via an appropriate serialization or parallelization. A connecting method includes, for example, an ultrasonic welding operation, a thermal welding operation, a laser welding operation, a rivet operation, a caulking operation or an electronic beam.

By serializing and/or parallelizing and multi-connecting the battery assemblies 136 as shown in FIG. 4, it is possible to provide a large scale battery assembly in the form of a battery assembly module 130.

Since the battery assembly module 130 can provide greater power, it is possible, for example, to be mounted as a power source for driving a motor of a vehicle 138 (see FIG. 5). The vehicle includes, for example, an electric vehicle, a hybrid electric vehicle or an electric train.

The battery assembly module 130, for example, can be elaborately controlled, such as controlling the charge in every exterior case 104 or every battery assembly 136. Accordingly, it is possible to achieve functional improvements such as an extension of driving distance per charging at one time or an extension of the lifetime of a battery mounted on a vehicle.

Figure 6:
FIG. 6 is a flow diagram illustrating a method of manufacturing the bipolar battery.
Figure 6:

FIG. 6 is a flow diagram of a method for manufacturing a bipolar battery. The method of manufacturing the bipolar battery of the first embodiment comprises the steps of forming an assembly unit as a sub-assembly unit wherein the electrolyte is applied to both surfaces of the bipolar electrode 110, overlapping the permeable separator with the electrolyte in any one of the bipolar electrodes 110, forming a bonded body by forming a stack of the assembly units (sub-assembly units) and assembling to house the stack within the exterior case.

Figure 7:
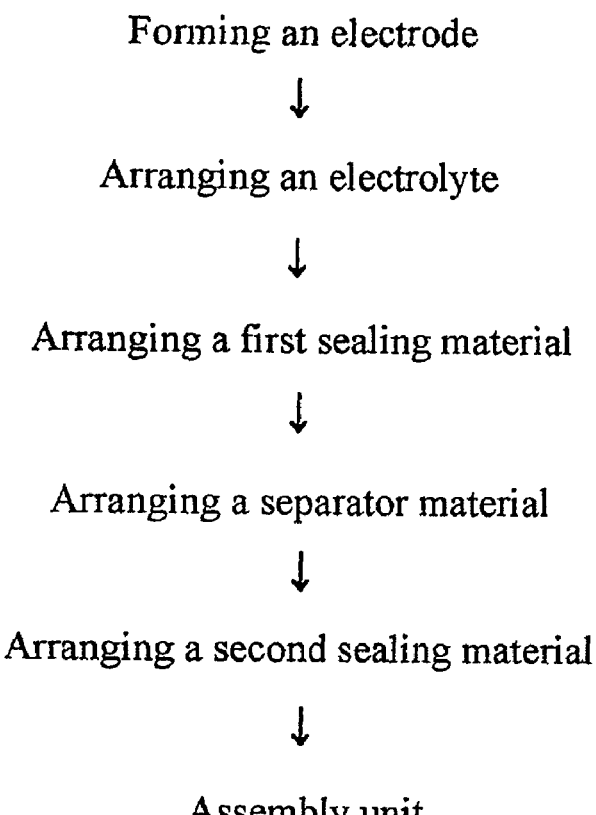
FIG. 7 is a flow diagram of a process for forming an assembly unit according to FIG. 6.
Figure 8:
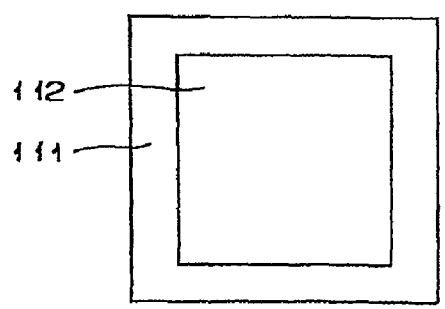
FIG. 8 is a plan view of an electrode formed by the process according to FIG. 7.
Figure 9:
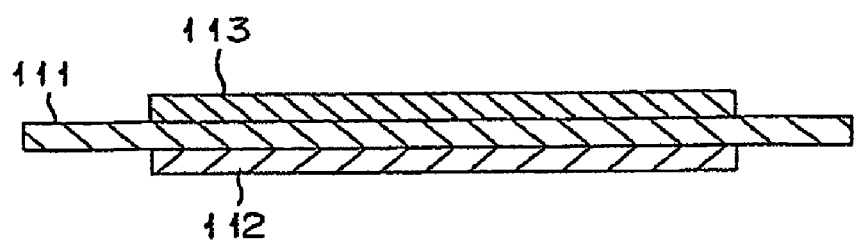
FIG. 9 is a cross-sectional view of an electrode formed by the process according to FIG. 7.
Figure 10:
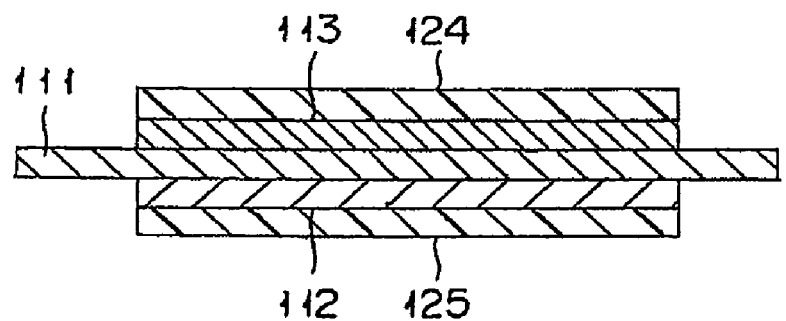
FIG. 10 is a cross-sectional view of an electrolyte arranged by the process according to FIG. 7.
Figure 11:
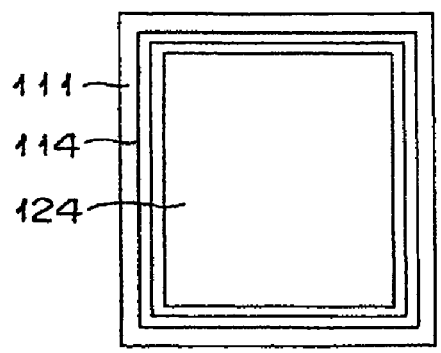
FIG. 11 is a plan view of a first sealing material formed by the process according to FIG. 7.
Figure 12:
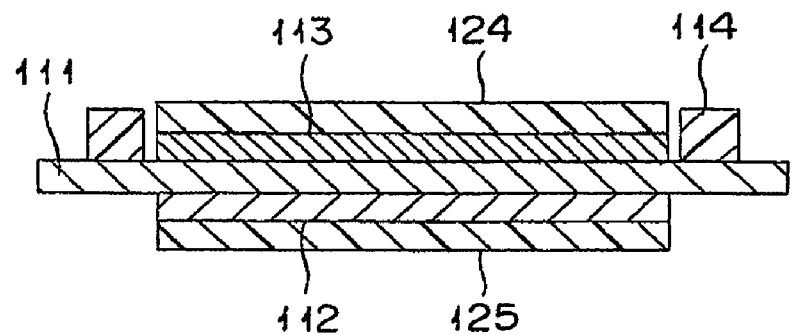
FIG. 12 is a cross-sectional view of a first sealing material formed by the process according to FIG. 7.
Figure 13:
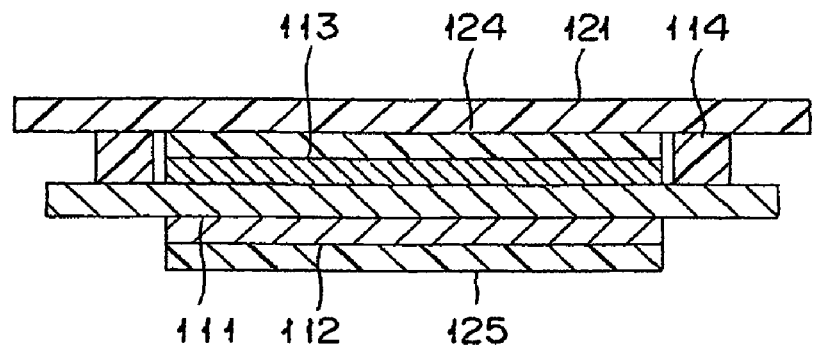
FIG. 13 is a cross-sectional view of the arrangement of a separator material formed by the process according to FIG. 7.
Figure 14:
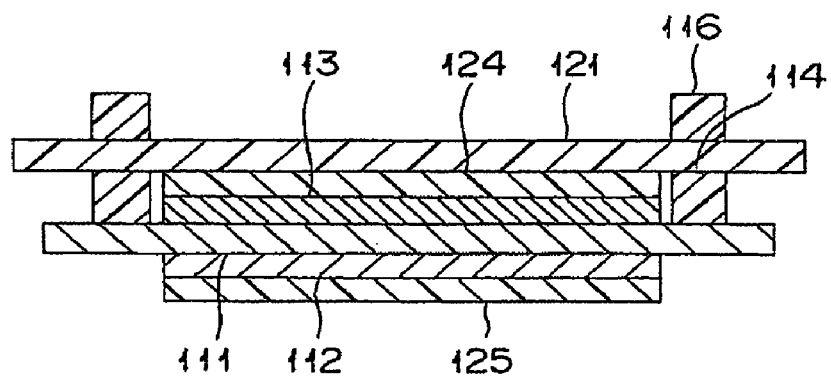
FIG. 14 is a cross-sectional view of an arrangement of a second sealing material formed by the process according to FIG. 7.

FIG. 7 is a flow diagram of the process for forming the assembly unit according to FIG. 6. As shown in FIG. 7, the process of forming the assembly unit comprises the steps of forming the electrode, arranging the electrolyte, arranging the first sealing material, arranging the separator material and arranging the second sealing material. FIG. 8 is a plan view and FIG. 9 is a cross-sectional view of the electrode formed according to FIG. 7. FIG. 10 is a cross-sectional view the electrolyte arranged according to FIG. 7. FIG. 11 is a plan view and FIG. 12 is a cross-sectional view of the first sealing material arranged according to FIG. 7. FIG. 13 is a cross-sectional view of a separator material arranged according to FIG. 7. FIG. 14 is a cross-sectional view of a second sealing material arranged according to FIG. 7.

In the process of forming the electrode, a cathode slurry is first prepared. The cathode slurry is prepared to have a cathode active material of 85 wt %, a conductive auxiliary agent of 5 wt % and a binder of 10 wt %. The cathode slurry obtains a desired viscosity by adding a viscosity adjusting solvent therein. As an example, the cathode active material is $LiMn_2O_4$, the conductive auxiliary agent is acetylene black, the binder is PVDF (polyvinylidene fluoride), and the viscosity adjusting solvent is NMP (N-methyl-2-pyrolidone). The cathode slurry is applied to one side surface of the collector 111 composed of, for example stainless steel foil. This is a non-limiting example. The conductive auxiliary agent, for example, may include carbon black or graphite. The binder and the viscosity adjusting solvent are not limited to PVDF and NMP.

Next, an anode slurry is prepared. The anode slurry is prepared, for example, to have an anode active material of 90 wt % and a binder of 10 wt %. The anode slurry obtains a desired viscosity by adding the viscosity adjusting solvent therein. The anode slurry is applied to another side surface of the collector 111. As a non-limiting example, the anode active material is hard carbon, and the binder and the viscosity adjusting solvent are PVDF and NMP. The anode slurry is applied to the other side surface of the collector 111.

Applied membranes of the cathode slurry and the anode slurry are, for example, dried by using a vacuum oven to form the cathode 113 and the anode 112 (see FIG. 9). At this time, any NMP is removed by being volatilized. Thicknesses of the cathode 113 and the anode 112 are certainly not limited and may be set depending on the purpose of use (e.g., emphasis on power or energy) or on ion conductivity.

The electrolytes 124 and 125 are applied to an electrode portion of the cathode 113 and the anode 112, respectively (see FIG. 10). The electrolytes 124 and 125 are prepared to have an electrolytic solution of 90 wt % and host polymer of 10 wt %. These electrolytes 124 and 125 obtain a viscosity suitable for applying by adding a viscosity adjusting solvent therein. The electrolytic solution includes an organic solvent composed of PC (propylene carbonate) and EC (ethylene carbonate), and including lithium salt ($LiPF_6$) as a support salt. The concentration of the lithium salt is 1M, for example. The host polymer is PVDF-HFP (copolymer of polyvinylidene fluoride and hexafluoropropylene) containing 10% of HFP (hexafluoropropylene) copolymer A viscosity preparing solvent is DMC (dimethyl carbonate). The viscosity preparing solvent is not limited to DMC.

In order to apply the electrolytes 124 and 125, the collector 111 on which the cathode 113 and the anode 112 are formed is installed at a loading board so that the anode 112 side is the top surface. Then, the electrolyte 125 is applied to the anode 112. Thereafter, a protective film is adhered on the applied electrolyte 125 prior to inverting the bipolar electrode 110. This inversion can be easily performed by using an inverting device, which will be explained below. By providing the protective film, even if the bipolar electrode 110 is inverted, the electrolyte is protected when it becomes a bottom surface. The protective film is formed from resin such as polyethylene. The electrolyte is then applied to the cathode 113, which becomes the top surface after inversion.

In the process of arranging the first sealing material 114, a single-liquid uncured epoxy resin is applied past the outer periphery of the cathode 113 on a portion of the exposed remainder of the collector 111 (see FIGS. 11 and 12). For the arrangement of the first sealing material 114, the application may be made with a dispenser, for example.

In the process of arranging the separator material, the separator 121 is arranged to cover an entire cathode side surface of the collector 111 (see FIG. 13). To this end, the separator 121 is overlapped with the electrolyte and the first sealing material 114. For the arrangement of the separator 121, separator arranging devices 240 and 340, which will be explained below, are used (see FIGS. 30 and 44).

In the process of arranging the second sealing material 116, a single-liquid uncured epoxy resin as a charging material is arranged on the side of the separator 121 opposite the first sealing material 114 (see FIG. 14). For the arrangement of the second sealing material 116, for example, application is made by a dispenser.

To this end, the electrolyte 125 is provided on one side of the bipolar electrode 110. The assembly unit (sub-assembly unit) 108 is formed at the other side of the bipolar electrode 110. In the assembly unit, the electrolyte 124, the first and second sealing materials 114 and 116, and the separator 121 are sequentially installed.

In the process of arranging the first and second sealing materials 114, 116, a thickness of the first sealing material 114 is predetermined to be less than a total thickness of the cathode 113 and electrolyte 124 according to one example. A thickness of the second sealing material 116 is predetermined to be less than a total thickness of the anode 112 and electrolyte 125 in certain examples. Specifically, since the separator 121 contacts a center portion wherein the electrolytes 124 and 125 are arranged prior to contacting the first and second sealing materials 114 and 116 arranged at the outer periphery, it is possible to restrain the remaining gas at the inner portion surrounded by the first and second sealing materials 114 and 116.

Figure 15:
FIG. 15 is a flow diagram of a process for forming a bonded body according to FIG. 6.
Figure 15:
Figure 15:
Figure 15:
Figure 15:
Figure 15:
Figure 15:
Figure 16:
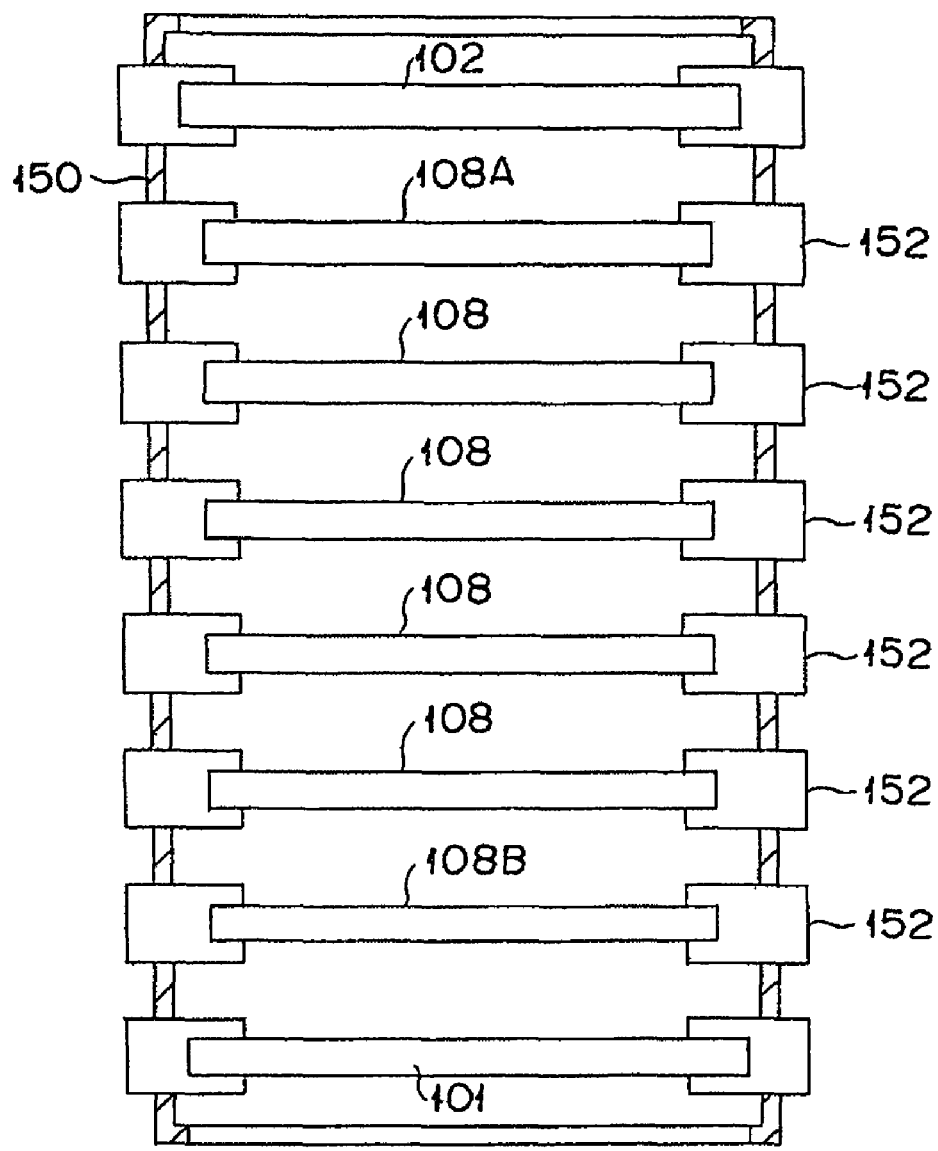
FIG. 16 is a cross-sectional view of an assembly unit set by the process shown in FIG. 15.
Figure 17:
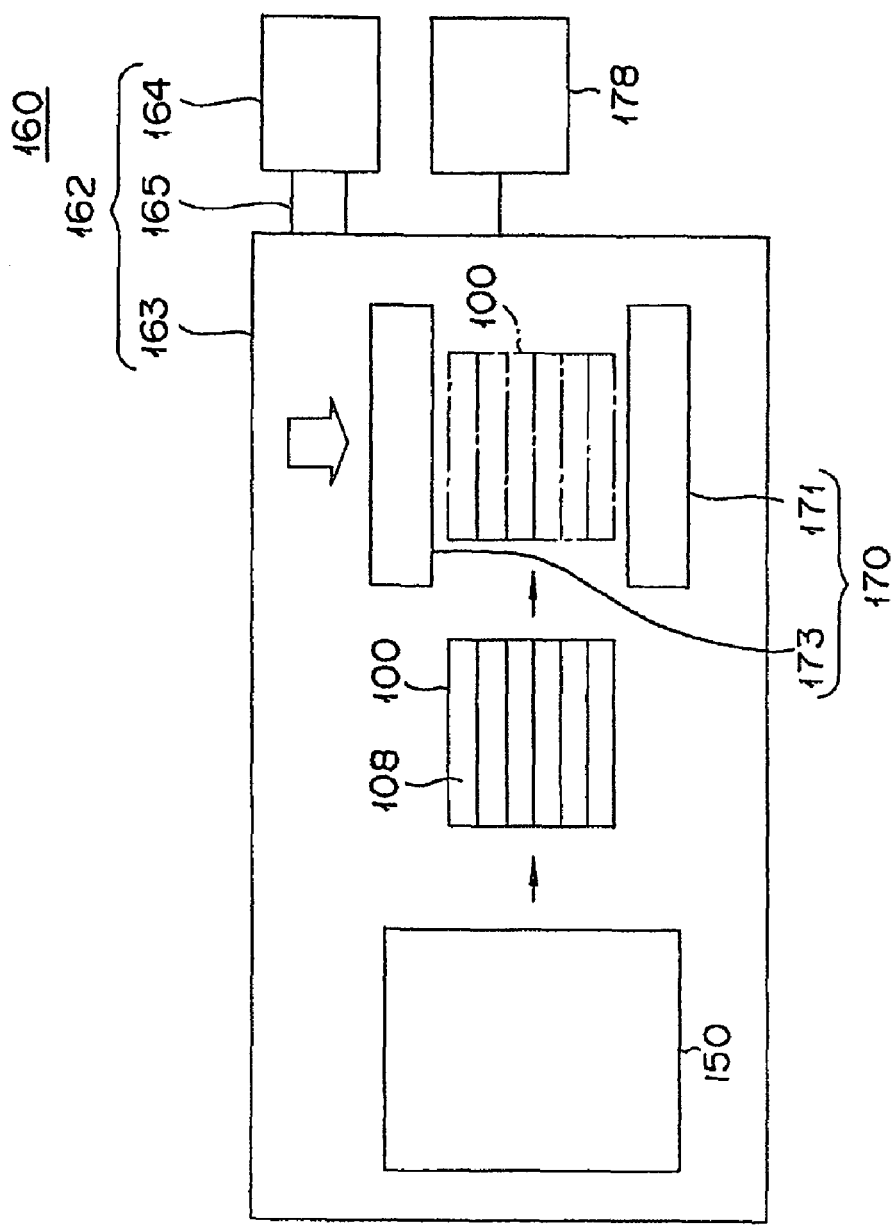
FIG. 17 is a diagram of the stacking and pressing of the process according to FIG. 15.
Figure 18:
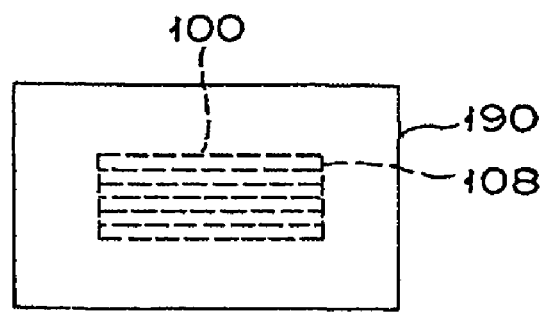
FIG. 18 is a diagram of a sealing layer formed by the process according to FIG. 15.
Figure 19:
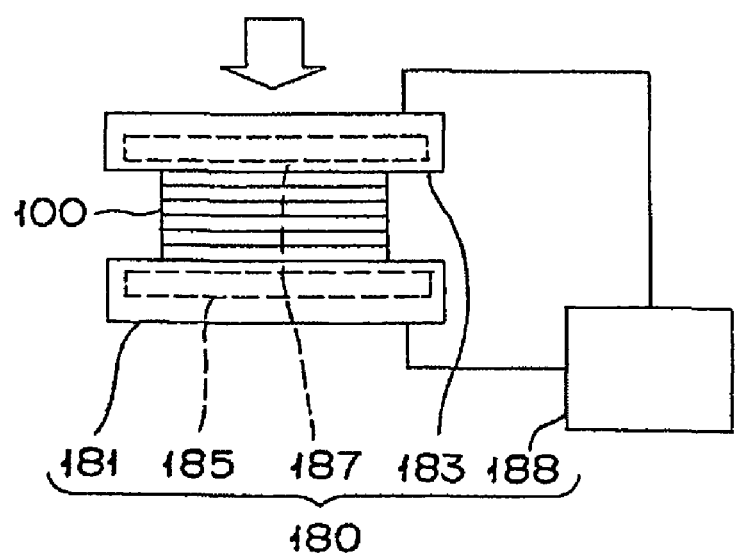
FIG. 19 is a diagram of an interface formed by the process according to FIG. 15.
Figure 20:
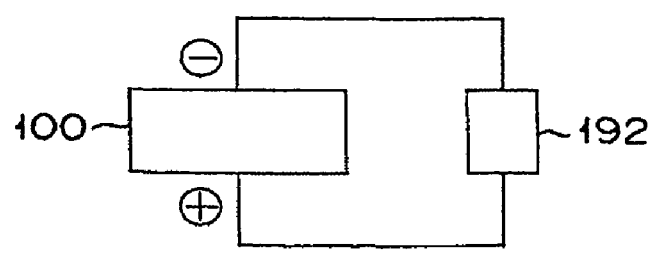
FIG. 20 is a diagram of the initial charging according to FIG. 15.

FIG. 15 is a flow diagram of a process for forming a bonded body according to FIG. 7. The process of forming the bonded body comprises the steps of setting the assembly unit, stacking, pressing, forming a sealing layer, forming an interface, initially charging and exhausting the gas. FIG. 16 is a cross-sectional view of an assembly unit set according to FIG. 15. FIG. 17 is a diagram of a process for stacking and a process for pressing according to FIG. 15. FIG. 18 is a diagram of a sealing layer formed according to FIG. 15. FIG. 19 is a diagram of a process for forming an interface according to FIG. 15. FIG. 20 is a diagram of a process for initial charging according to FIG. 15.

In the process of setting the assembly unit, a plurality of assembly units 108 are sequentially set in a magazine 150 shown in FIG. 16. At this time, the protective film is removed from the assembly unit 108. Further, the assembly unit 108 has an asymmetric top-bottom structure. Thus, the first sealing material 114 is merely installed at the bipolar electrode 110 in an uppermost assembly unit 108A. In a lowermost assembly unit 108B, the sealing material is also installed at the anode 112 side in addition to the constitution of the assembly unit 108. Also, the terminal plate 102 is arranged on the assembly unit 108A. Moreover, the terminal plate 101 is arranged beneath the assembly unit 108B.

In order to avoid any interference when setting the assembly unit 108, the magazine 150 has a clamp mechanism 152 in a frame shape and capable of embracing the outer peripheral portion of the assembly unit 108. The clamp mechanism 152 is arranged in a stacking direction with an interspacing such that the assembly units 108 do not contact each other. The stacking direction is vertical to a surface direction of the assembly unit 108. The clamp mechanism 152 is configured, for example, to have an elastic member composed of a spring and to be retainable and supportable when assigning a tensile force to the assembly unit 108 based on an elastic force such that corrugation is not generated.

In the process for stacking the assembly unit, as shown in FIG. 17, the magazine 150 is arranged within a vacuum treatment device 160, and the stack 100 of the assembly unit 108 is formed under vacuum. The vacuum operates within a range of 0.2 to $0.5 \times 10^5$ Pa.

Because it is in a vacuum, the introduction of gas into a stacking interface of the electrode and the electrolyte layer can be eliminated. Because no bubble is introduced, ion movement is not restrained and battery resistance is not increased, thus creating a greater power density.

The method of forming the stack 100 is certainly not limited to this description. For example, the stack 100 may be formed by controlling the clamp mechanism 152 for holding the assembly unit 108 while moving the magazine 150 toward a cradle, as well as by sequentially releasing the assembly unit 108 when contacting the cradle.

The vacuum treatment device 160 has a vacuuming means 162, a pressing means 170 and a controller 178. The controller 178 can be, for example, a microcomputer including a random access memory (RAM), a read-only memory (ROM) and a central processing unit (CPU) in addition to various input and output connections. Generally, the control functions are performed by execution by the CPU of one or more programs stored in ROM.

The vacuuming means 162 has a vacuum chamber 163, a vacuum pump 164 and a piping system 165. The vacuum chamber 163 has a detachable cover portion and a fixed base wherein the magazine 150 and the pressing means 170 are arranged. The vacuum pump 164 is, for example, centrifugal and is used to apply a vacuum to the vacuum chamber 163. The piping system 165 connects the vacuum pump 164 and the vacuum chamber 163, and a leak valve (not shown) is arranged therein.

The pressing means 170 has a base plate 171 and a press plate 173, which are arranged so as to be close to and spaced apart from the base plate 171. The controller 178 is used for controlling the movement or pressing force of the base plate 173. Optionally, an elastic body in a sheet-shape may be arranged on the base plate 171 and the press plate 173. During pressing, the stack 100 is pressed by the press plate and the base plate 171 while maintaining a vacuum state (see FIG. 17). By doing so, the first and second sealing materials 114 and 116 are pressed to the desired thicknesses. The pressing pressure is, for example, 1 to $2\times10^6$ Pa.

In the process of forming the sealing layer, the stack 100 shown in FIG. 18 is arranged in an oven 190 and then heated, thereby curing the first and second sealing materials 114 and 116 included in the stack 100, forming the first and second sealing layers 115 and 117. The heating temperature is, for example, 80° C. A method of heating the stack 100 is certainly not limited to using the oven.

Although lithium secondary batteries dislike moisture, the introduction of moisture cannot be avoided due to the sealing layer composition. To minimize exposure to moisture, the thicknesses of the first and second sealing materials 114 and 116 are small, minimizing the contact between the outer atmosphere and the first and second sealing layers 115 and 117.

Optionally, a thermoplastic resin may be applied to the first and second sealing materials 114 and 116. In such a case, the first and second sealing materials 114 and 116 are plasticized by heating to form the first and second sealing layers 115 and 117.

In the process of forming an interface, since the stack 100 is pressed and heated, the electrolytes 124 and 125 penetrate into the separators 121 and 122 included in the stack 100 and a gel interface is formed thereon (see FIG. 19). The heating temperature and pressing pressure are, for example, 80° C. and 1 to $2\times10^6$ Pa. By this process, assembly units 108 are stacked so that the integrated stack (bonded body) 100 is obtained.

As shown in FIG. 19, the pressing means 180 has a base plate 181, a press plate 183 arranged so as to be close to and spaced apart from the base plate 181, a lower portion heating means 185, an upper portion heating means 187 and a controller 188. The lower portion heating means 185 and the upper portion heating means 187 have a resistance heating element, for example, and they are arranged within the base plate 181 and the press plate 183 and used to increase the temperature of the base plate 181 and the press plate 183. The controller 188 is used for controlling the movement and pressing force of the press plate 183 as well as controlling the temperature of the lower portion heating means 185 and the upper portion heating means 187. The controller 188 can be, like the controller 178, a microcomputer including RAM, ROM and a CPU in addition to various input and output connections.

Optionally, one of the lower portion heating means 185 and the upper portion heating means 187 may be omitted. Alternatively, the lower portion heating means 185 and the upper portion heating means 187 may be arranged at an outer portion of the base plate 181 and the press plate 183. Further, a sheet-shaped elastic body may be arranged in the base plate 181 and the press plate 183.

In the process of initially charging the stack 100, a first charging operation is performed by a charging/discharging device 192 electrically connected to the stack 100, generating a bubble (see FIG. 20). The initial charging condition is, for example, a capacity base approximately calculated from an application weight of the cathode, i.e., 4 hours in 21 V–0.5 C.

To remove or exhaust the bubble, for example, the gas at a center portion of the stack 100 is moved to the outer periphery and is then removed by pressing a roller against a surface of the stack 100. This improves the power density of the battery.

In the process of casing, the integrated stack 100 is housed within the exterior case 104 (see FIG. 3) to thereby manufacture the bipolar battery 10 (see FIGS. 2 and 3). The exterior case 104 is formed by arranging the stack 100 between two sheet-shaped exterior materials and bonding an outer periphery of the exterior materials. The exterior materials are polymer-metallic composite laminate film coated by an insulator such as a polypropylene film and bonded by applying a thermal fusion.

It is possible to achieve greater capacity and/or power in the bipolar battery by further stacking the integrated stacks 100 upon one another and then housing them within the exterior case 104. Optionally, it is possible to perform the processes of stacking and pressing under atmospheric pressure or the processes of forming the sealing layer and the interface under vacuum.

By appropriately selecting the electrolytes 124 and 125 and the first and second sealing materials 114 and 116, the process for forming the sealing layer and the process for forming the interface are integrated. The hardening of the first and second sealing materials 114 and 116 and the completing of the electrolyte layer are performed simultaneously. By doing to, it is possible to reduce the number of manufacturing steps. Optionally, a process for attaching a tab (lead line) for monitoring a potential of each layer (bipolar unit battery) of the stack 100 may be added between the processes of forming the sealing layer and forming the interface.

Figure 21:
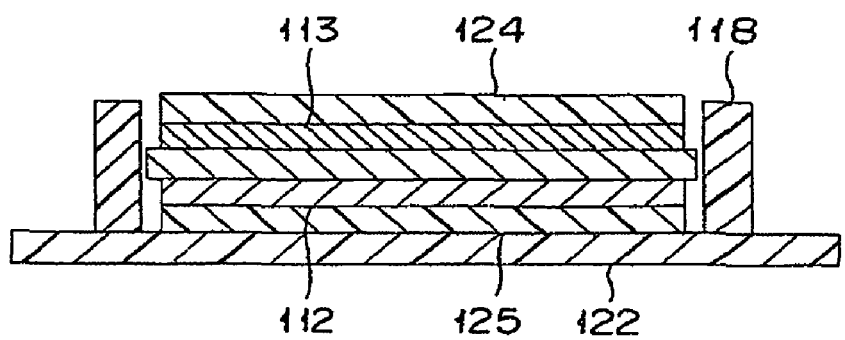
FIG. 21 is a cross-sectional view of a modified example of the assembly unit.

The first and second sealing materials 114 and 116 are arranged between the collector 111 and the separator 121 and extend to surround the cathode 113 and anode 112. However, a sealing structure is certainly not limited to the above. For example, it is possible to arrange a sealing material 118, shown in FIG. 21, so as to extend to the surroundings of the cathode 113, the collector 111 and the anode 112.

Since the gel polymer class electrolyte is a thermoplastic retaining the electrolyte within a polymer framework, liquid leakage is prevented, improving the bipolar battery reliability. The gel polymer class electrolyte is not limited to thermoplastic as, for example, it may be a thermoset. In such a case, the liquid leakage is prevented by hardening the electrolyte layer by pressing under heating to thereby prevent the liquid leakage.

The surface pressure used in the pressing process is not limited to 1 to $2 \times 10^6$ Pa, as other pressures may be appropriately established by considering other material properties, such as the strength of materials that constitute the stack 100. The heating temperature in the process for forming the sealing layer is not limited to 80° C. It can be within a range between 60° C. and 150° C., with the operational temperature determined by considering material properties such as the heat resistance of electrolytic solution or the hardening temperature of the sealing materials 114, 116.

Further, the electrolytes 124 and 124 are not limited to the gel polymer class since they may include the electrolytic solution class. In such a case, in the process for arranging the electrolyte, for example, the electrolytic solution is applied to each electrode portion of the cathode 113 and anode 112 by using a micropipette and sank therein (see FIG. 10). Moreover, the electrolytic solution includes an organic solvent composed of PC (propylene carbonate) and EC (ethylene carbonate), and includes a lithium salt ($LiPF_6$) as a support salt and a small quantity of surfactant. The concentration of the lithium salt is 1M, for example. The organic solvent is not limited to PC and PE since it may include other ring-type carbonate classes, chain-type carbonate classes such as dimethyl carbonate or ether classes such as tetrahydrofuran. The lithium salt is not limited to $LiPF_6$ since it may include other inorganic anionic salts and organic anionic salts such as $LiCF_3SO_3$.

Figure 22:
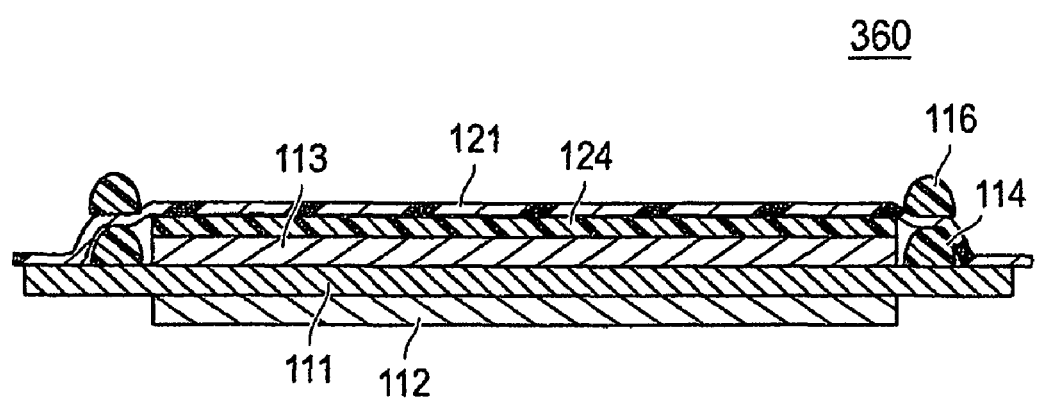
FIG. 22 is a cross-sectional view of another modified example of the assembly unit.
Figure 23:
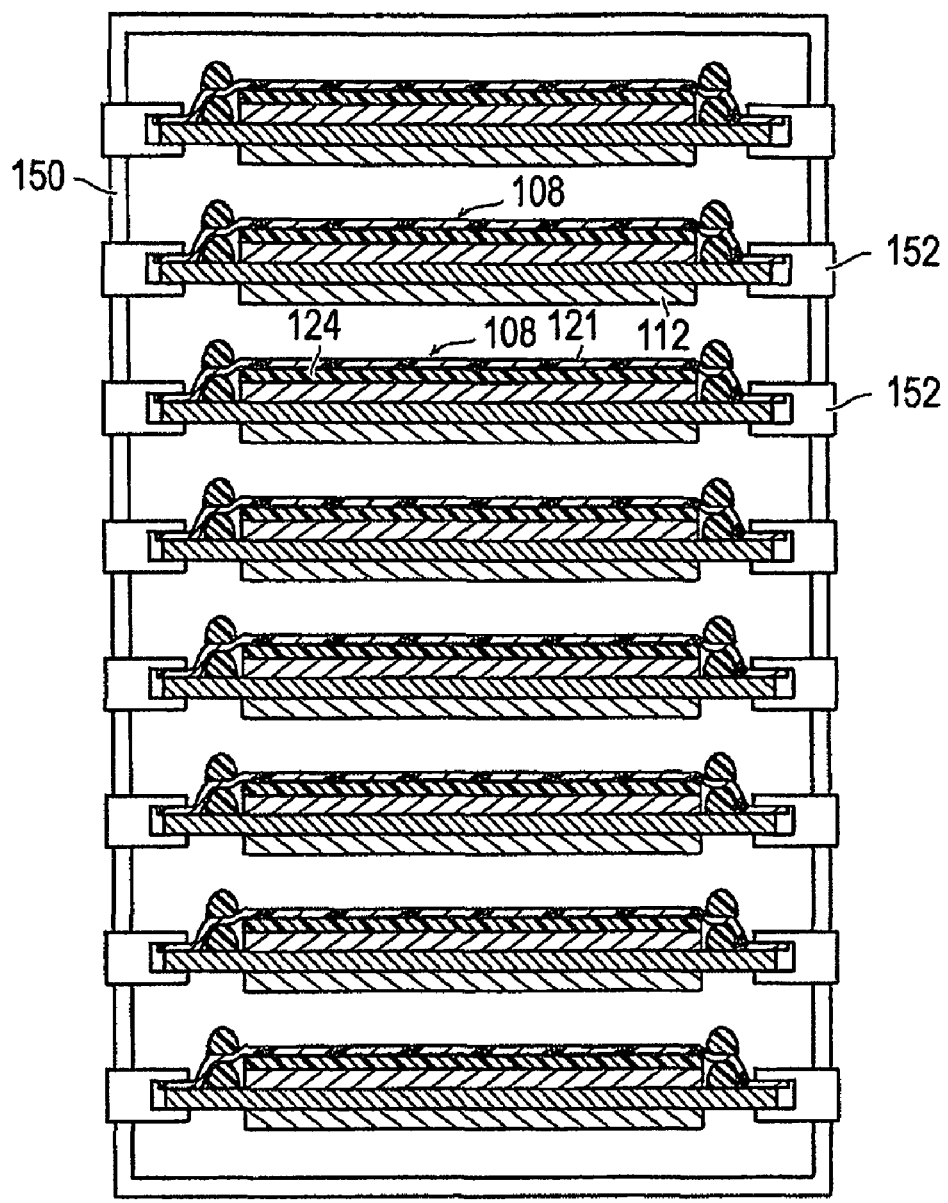
FIG. 23 is a cross-sectional view illustrating stacking of the assembly unit of FIG. 22.

FIG. 22 is a cross-sectional view of another modified example of an assembly unit 360. FIG. 23 is a cross-sectional view illustrating a stacked body formed of the assembly units of FIG. 22. It should be noted that, in the drawings, the sizes may be somewhat exaggerated in some cases in order to easily explain the features. For example, the separator 121 and the bipolar electrode 110 are shown to be thicker than they actually are. However, an end of the separator 121 is actually hung by its own weight.

As shown in FIG. 22, the electrolyte 124 may be optionally provided only at the cathode 113 side, rather than both the cathode 113 and anode 112 sides. When using such an assembly unit 360 in the process of stacking to obtain a device shown in FIG. 23, the electrolyte 124 penetrates into the permeable separator 121 through to the opposite side of the separator 121, thereby penetrating the anode 112 to which the electrolyte is not provided. When stacking the assembly units 360, if the anode 112 side of the bipolar electrode 110 contacts the separator 121 of the adjacent another assembly unit 360, then the bubble N is not generated between the separator 121 and the anode 112 since the electrolyte is not provided at the anode 112. Therefore, the bipolar battery 10 is manufactured having superior battery performance. In such a process of stacking, in certain embodiments it is preferred that the pressure within a vacuum container is 1 kPa or less.

Next, an apparatus for manufacturing the bipolar battery in accordance with a first embodiment is explained.

Figure 24:
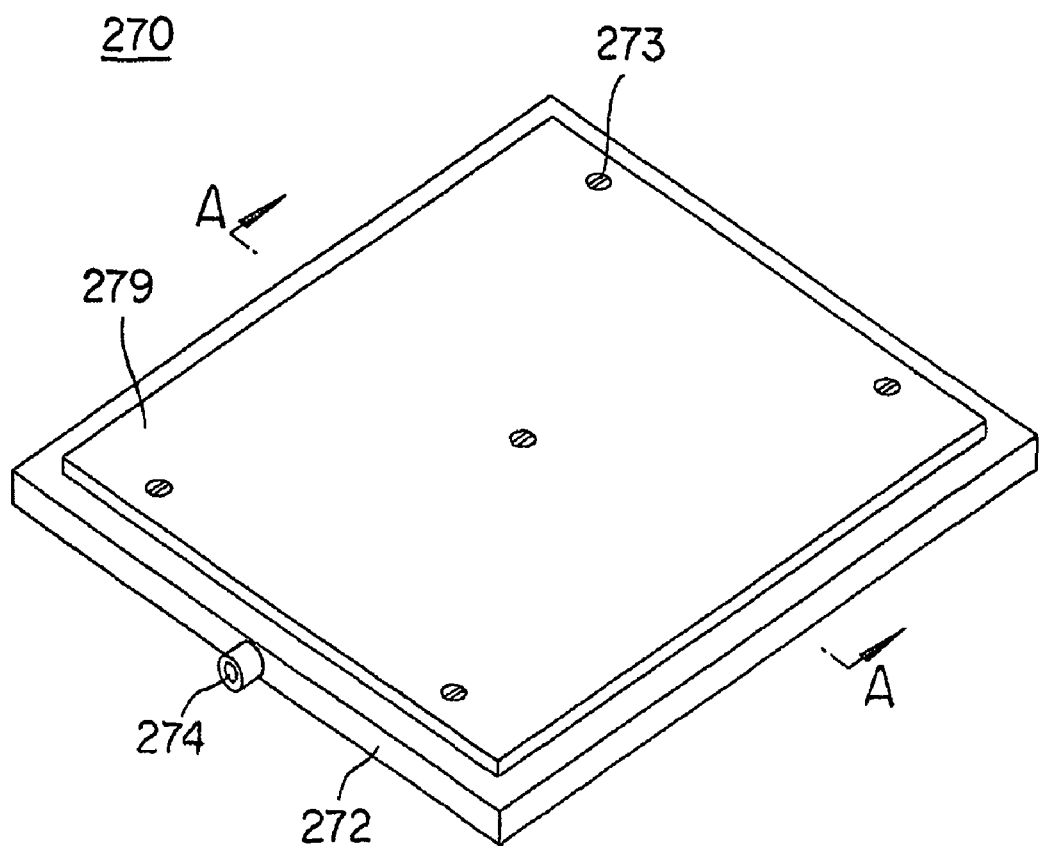
FIG. 24 is a perspective view of a pallet for loading a bipolar electrode.
Figure 25:
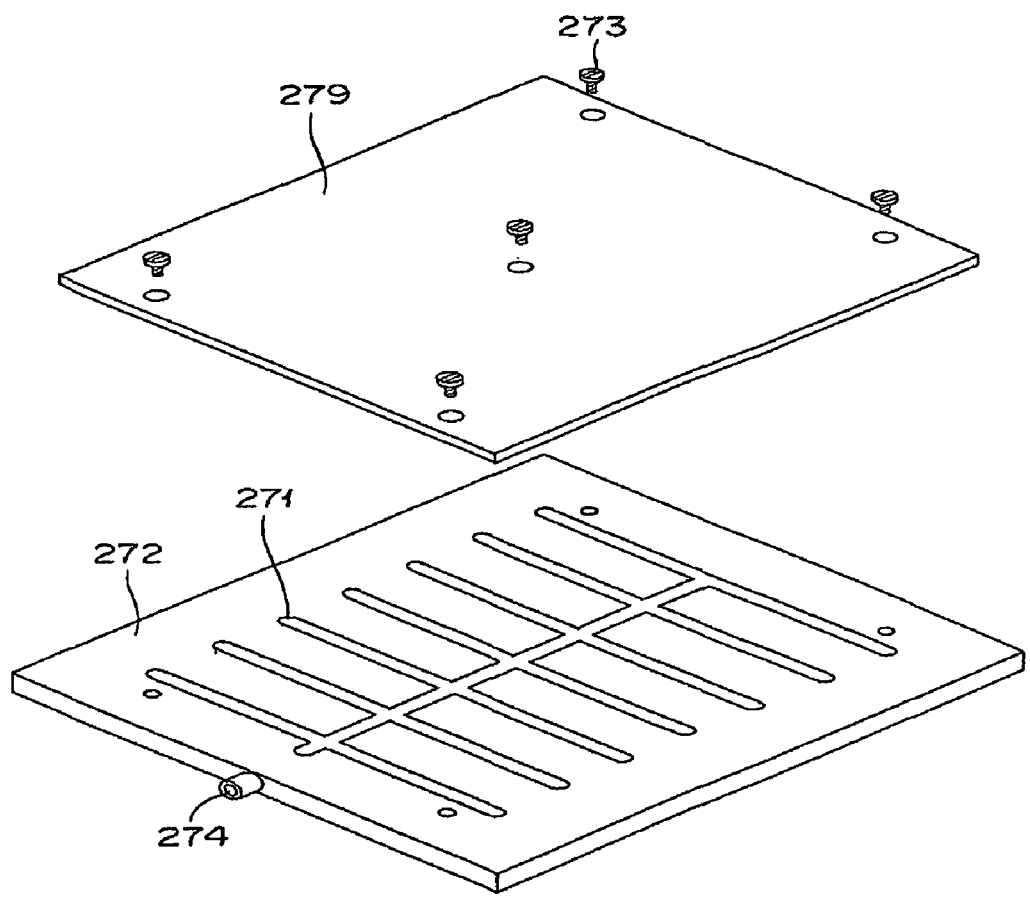
FIG. 25 is an exploded perspective view of the pallet.
Figure 26:
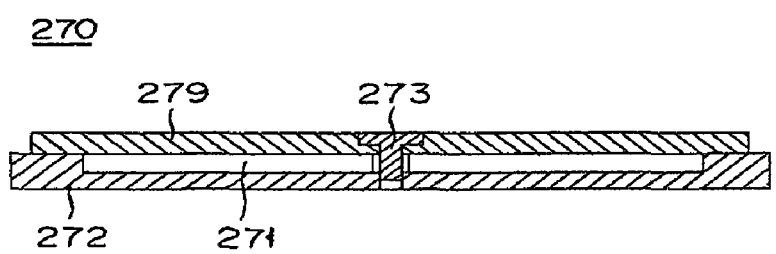
FIG. 26 is a cross-sectional view taken along the line A-A shown in FIG. 24.

FIG. 24 is a perspective view of a pallet for loading the bipolar electrode. FIG. 25 is an exploded perspective view of the pallet. FIG. 26 is a cross-sectional view taken along the line A-A shown in FIG. 24.

Figure 27A:
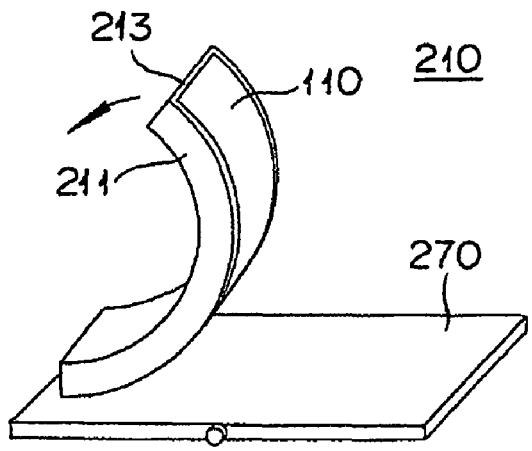
FIGS. 27A-27C are perspective views of an inverting device of the first embodiment.
Figure 27B:
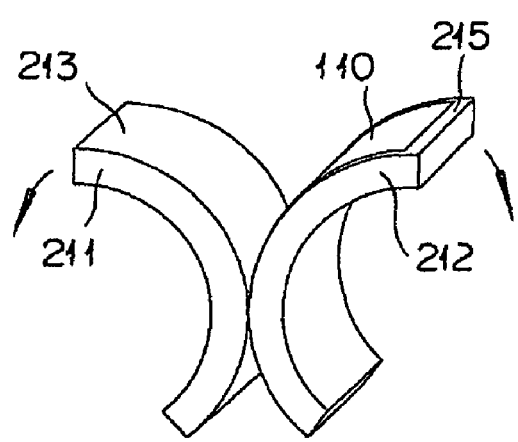
Figure 27C:
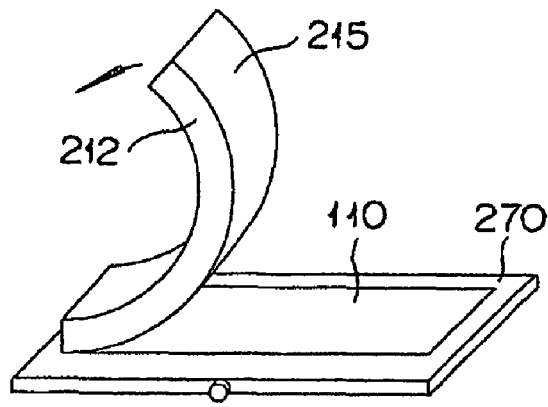
Figure 28:
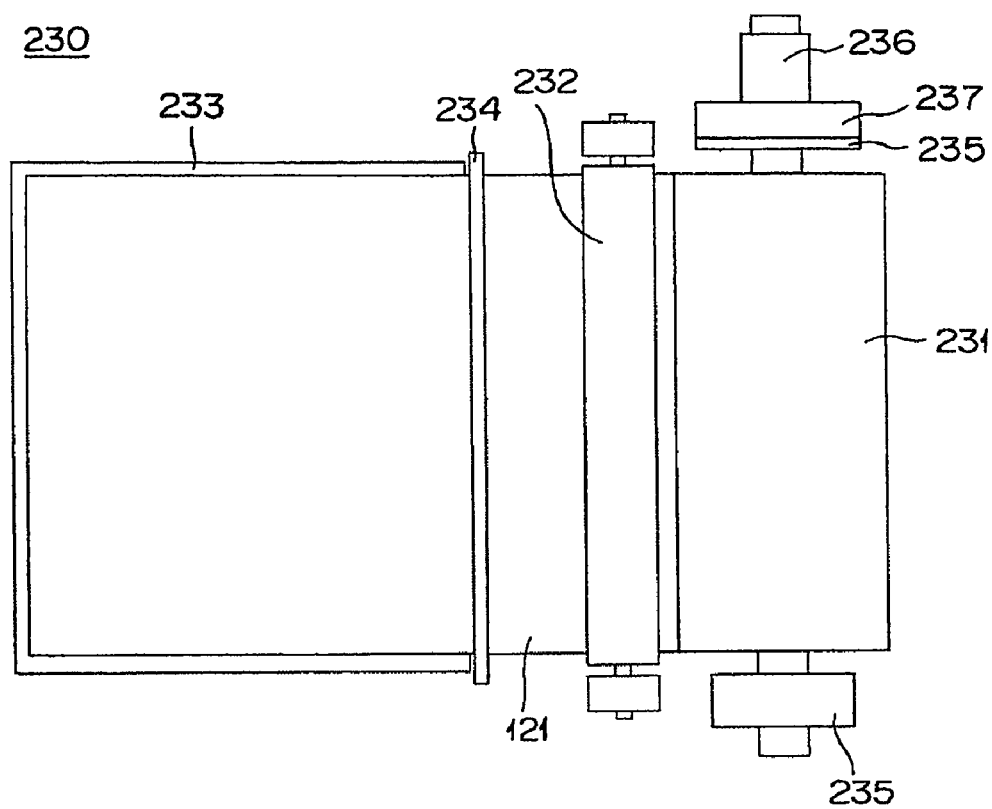
FIG. 28 is a top view of a separator feeding device of the first embodiment.
Figure 29:
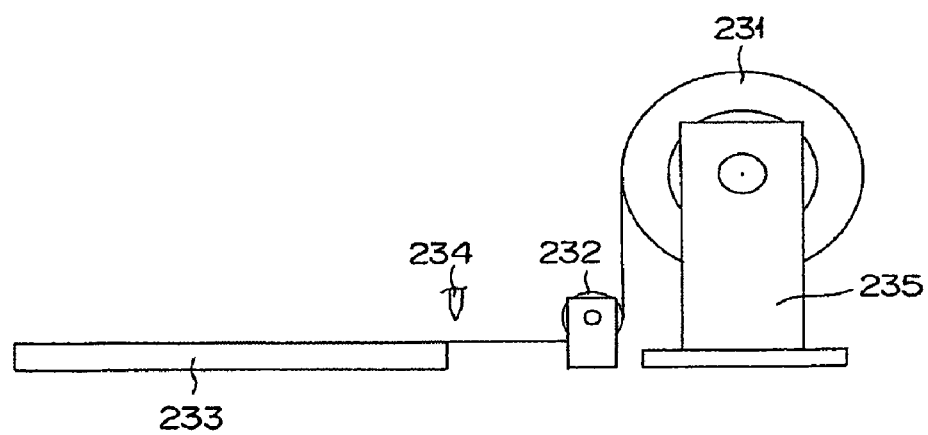
FIG. 29 is a side view of the separator feeding device.
Figure 30:
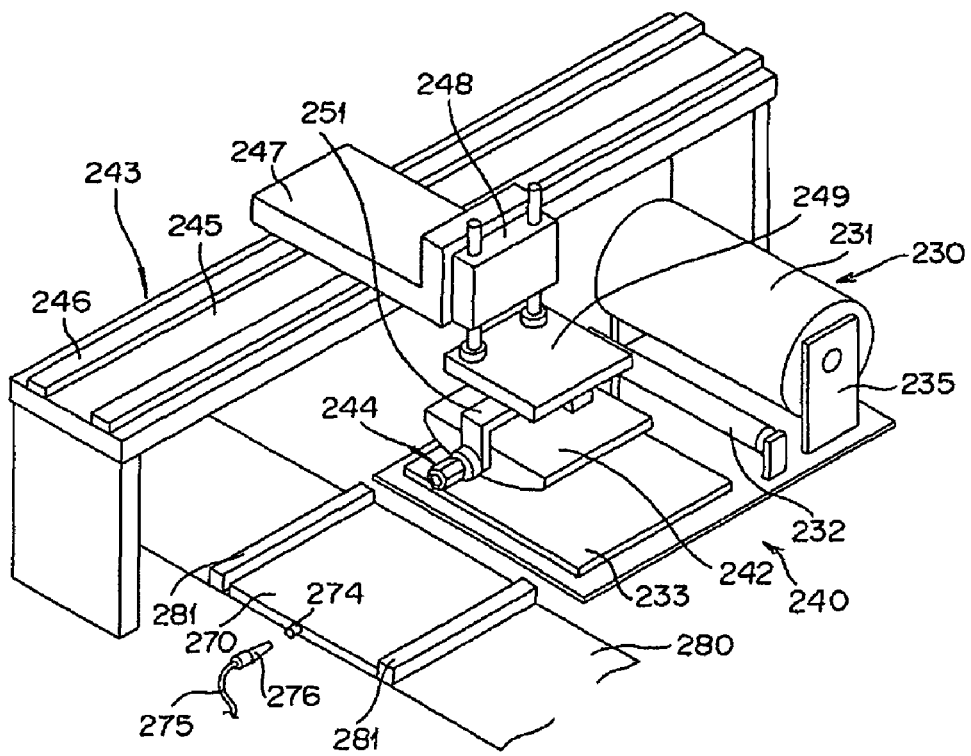
FIG. 30 is a perspective view of a separator arranging device of the first embodiment.

An apparatus for manufacturing the bipolar battery comprises an inverting device 210, shown in FIGS. 27A-27C, for arranging the electrode, a separator feeding device 230, shown in FIGS. 28 and 29, for arranging the separator material, and a separator arranging device 240, shown in FIG. 30.

In the process of forming the assembly unit, processes for arranging the electrolytes 124 and 125, the sealing materials 114 and 116 and the separator 121 in the bipolar electrode 110 are performed on a pallet 270, which is prepared in every bipolar electrode 110 (see FIGS. 24 to 26). The pallet 270, as shown in FIG. 30, is retained in a positioning mechanism 281 installed on a conveyor 280 and moved in each process. Because the operation is performed on the conveyor 280, it is possible to efficiently manufacture a plurality of assembly units 108 in a sequential manner.

Referring to FIGS. 24 to 26, the pallet 270 has a pallet body portion 272 and a porous plate 279. As shown in FIG. 25, an air exhausting groove 271, which becomes a path for suctioning the air, is formed in the pallet body portion 272. The porous plate 279 is fixed by a screw 273 in a surface wherein the air exhausting groove 271 of the pallet body portion 272 is formed. A vacuum lead-in aperture 274 communicating with the air exhausting groove 271 is formed on a side surface of the pallet body portion 272. A suction joint 276, which is formed on a leading end of an air tube hose 275 shown in FIG. 30, can be fitted into the vacuum lead-in aperture 274. The air tube hose 275 is connected to a vacuum pump (not shown). The porous plate may be a punching metal having a plurality of apertures, a foamed porous resin or a foamed porous metal.

When the pallet 270 shown in FIG. 30 is moved by the conveyor 280, the suction joint 276 is formed on the leading end of the air tube hose 275, making it possible to move the pallet 270 while being connected to the suction joint 276. Optionally, it is possible to connect the suction joint 276 to a driving source (not shown) such as an actuator. Further, the suction joint 276 may move forwardly and backwardly to connect with the vacuum lead-in aperture 274 of the pallet 270 in a process wherein a negative pressure must be applied to the pallet 270.

The bipolar battery 110 is arranged on the pallet 270 such that the suction joint 276 is connected to the vacuum lead-in aperture 274, and the vacuum lead-in aperture 274 is communicated to a vacuum pump (not shown). By doing so, the bipolar electrode 110 is suctioned and positioned in the porous plate 279 of the pallet 270. Then, a gel electrolyte is applied to one surface of the bipolar electrode 110, and a protective film is adhered thereto. Thereafter, the bipolar electrode 110 is inverted. For such an inversion, it is desirable that an inverting device 210 be used.

The inverting device 210, shown in FIG. 27, has a first suction portion 211 for receiving the bipolar electrode 110 from the pallet 270 by suctioning the bipolar electrode 110 on the pallet 270. The inverting device 210 also has a second suction portion 212 for receiving the bipolar electrode 110 retained in the first suction portion 211.

The first suction portion 211 has a curved first suction surface 213. The first suction surface 213 is configured to rotatably move while fitting the bipolar electrode 110 retained on the pallet 270 between the first suction portion 211 and the pallet 270 in a linear range having a desired width. A plurality of first suction apertures (not shown) is formed on the first suction surface 213. The first suction apertures can communicate with a vacuum pump (not shown) to thereby suction the bipolar electrode 110 arranged on the pallet 270. The suctioning force of the first suction portion 211 is set to be larger than that of the pallet 270 by adjusting a valve. This is so that the bipolar electrode 110 is moved to the first suction portion 211 while suctioning the bipolar electrode 110 to the pallet 270 (see FIG. 27A). As such, the bipolar electrode 110 is moved by the suctioning force difference while suctioning the bipolar electrode 110 from both the first suction portion 211 and the pallet 270. Thus, the generation of a corrugation in the bipolar electrode 110 can be prevented.

Similar to the first suction portion 211, the second suction portion 212 has a curved second suction surface 215 wherein a plurality of second suction apertures is formed. The second suction apertures can communicate with a vacuum pump (not shown). The second suction portion 212 is configured to rotate while fitting the bipolar battery 110 between the first suction surface 213 and the second suction portion 212 in a linear range having a desired width (see FIG. 27B).

A suctioning force of the second suction portion 212 may be set to be greater than that of the first suction portion 211 by adjusting a valve so that the first suction portion 211 and the second suction portion 212 are rotated in opposite directions while contacting the second suction portion 212 to the bipolar electrode 110 retained in the first suction portion 211. By doing so, the bipolar electrode 110 retained in the first suction portion 211 can be moved to the second suction portion 212.

Further, the second suction portion 212 is rotatably moved to the pallet 270 while retaining the bipolar electrode 110, thereby moving the bipolar electrode 110 to the pallet 270 (see FIG. 27C). At this time, the suctioning force of the pallet 270 is set to be greater than that of the second suction portion 212.

The bipolar electrode 110 is moved while suctioning with a suctioning force, which is larger than a side to be suctioned. Thus, the bipolar electrode 110 can be inverted without generating the corrugation in the very thin bipolar electrode 110.

As shown in FIGS. 28 and 29, the separator feeding device 230 comprises a separator roll 231 wherein the separator is rolled into a roll shape, a guide roller 232 for guiding the separator 121 extracted from the separator roll 231, a separator loading board 233 on which the extracted separator 121 is loaded, a cutting blade 234 for cutting the separator 121 in a desired length by moving forward and backward with respect to the extracted separator 121 and a separator extracting portion (not shown) for extracting the separator 121 by holding the separator 121.

The separator roll 231 is rotatably installed on a roll support 235, which is fixedly installed. Further, a servo motor 236 is connected to the separator roll 231 via a decelerator 237, and its rotation is controlled by another controller (like the controllers 178 and 188).

The separator 121 is held by a separator extracting portion (not shown) and extracted on the separator loading board 233. The separator extracting portion can hold the separator by holding or suctioning. Then, the cutting blade 234 is moved forward and/or backward along the separator 121 to cut the separator 121 to a desired length. The cut separator 121 is suctioned and retained by the separator arranging device 240, which is explained below.

Figure 31:
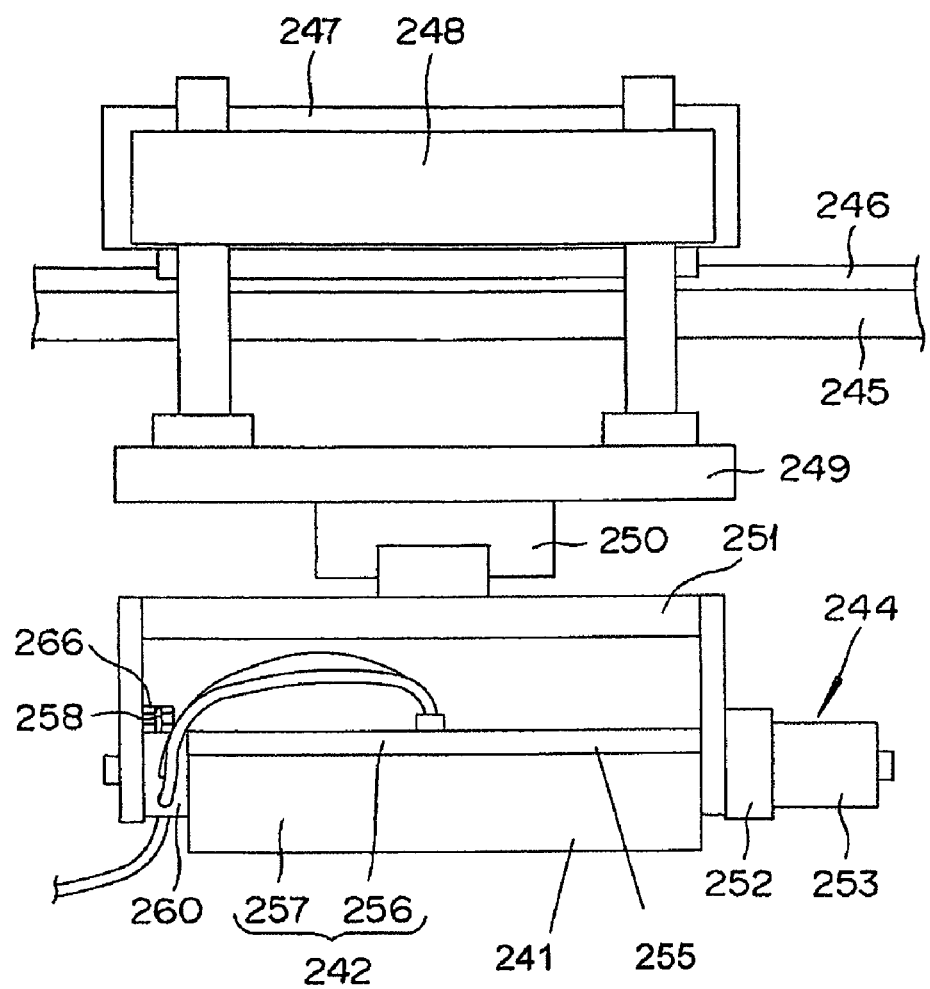
FIG. 31 is a front view of the separator arranging device.
Figure 32:
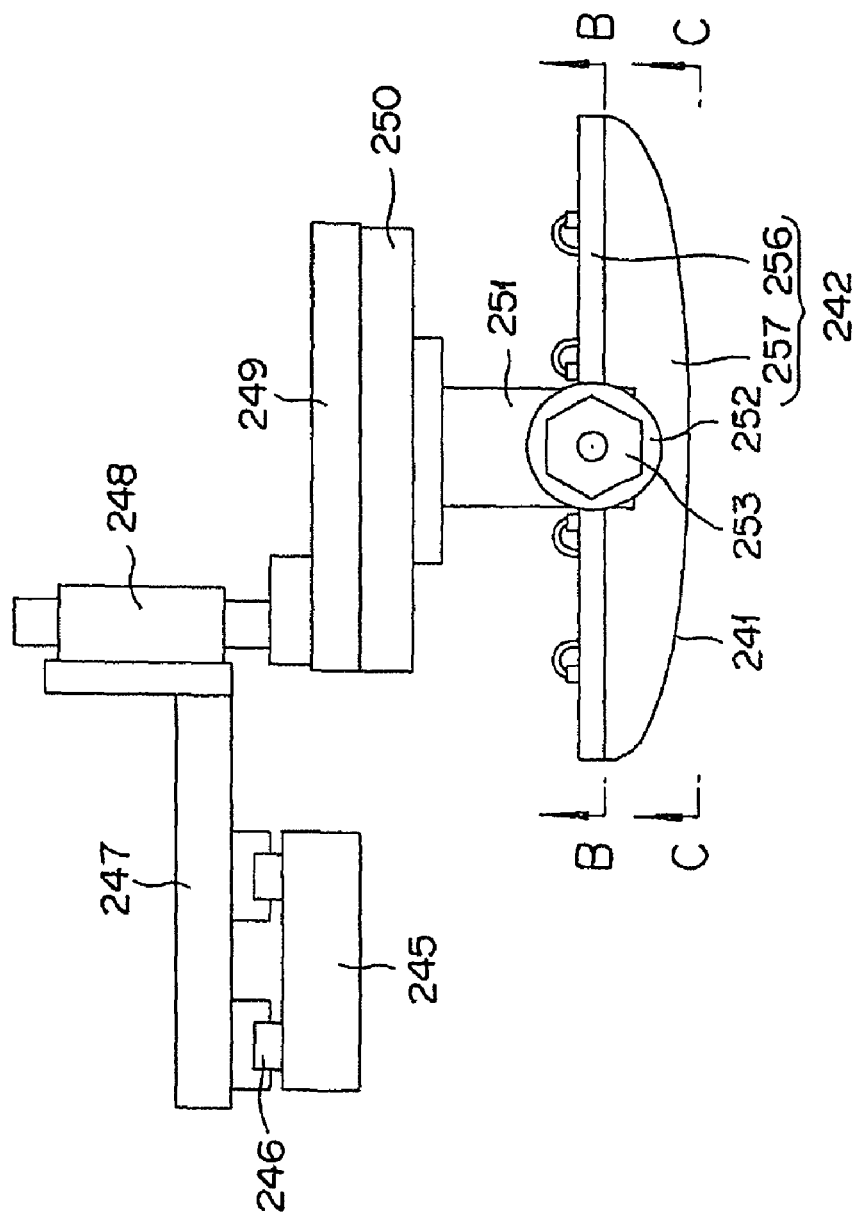
FIG. 32 is a side view of the separator arranging device.
Figure 33:
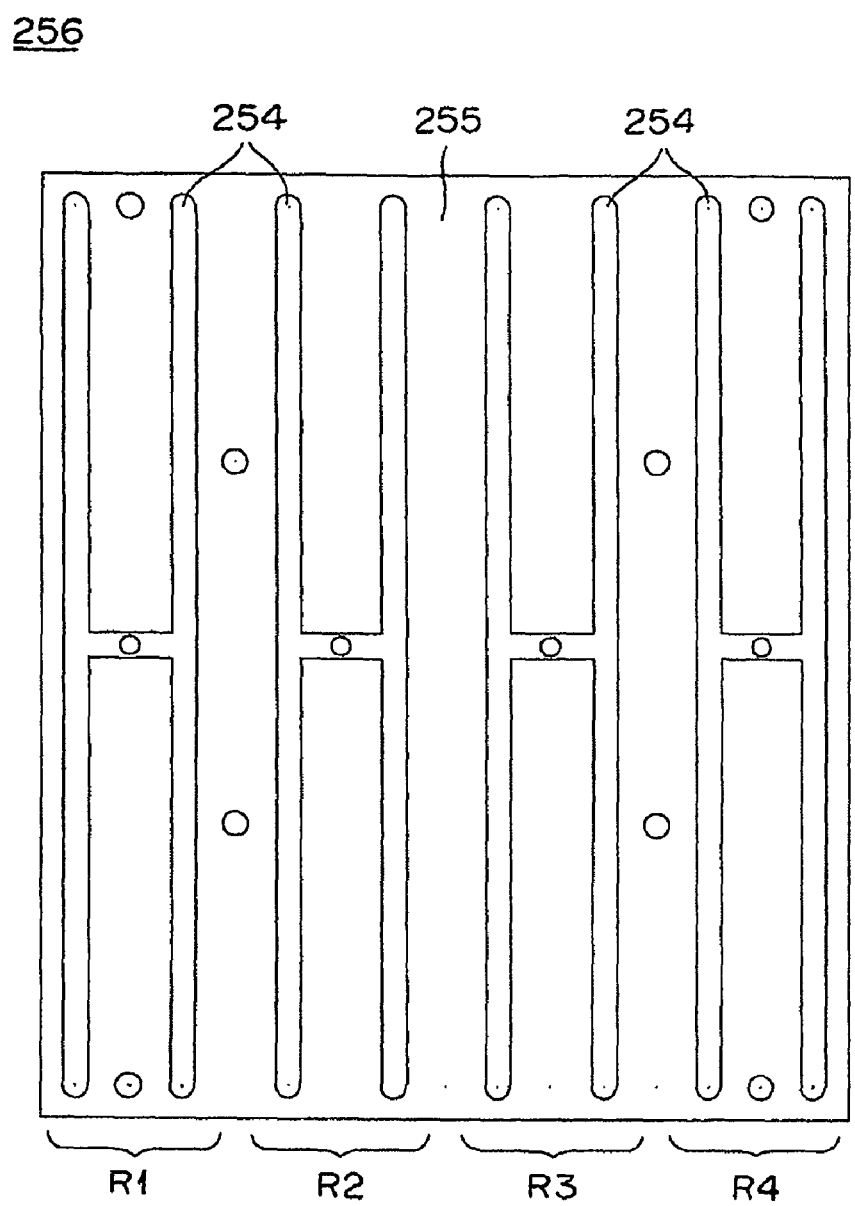
FIG. 33 is a front view of a suction body portion taken along the line B-B shown in FIG. 32.
Figure 34:
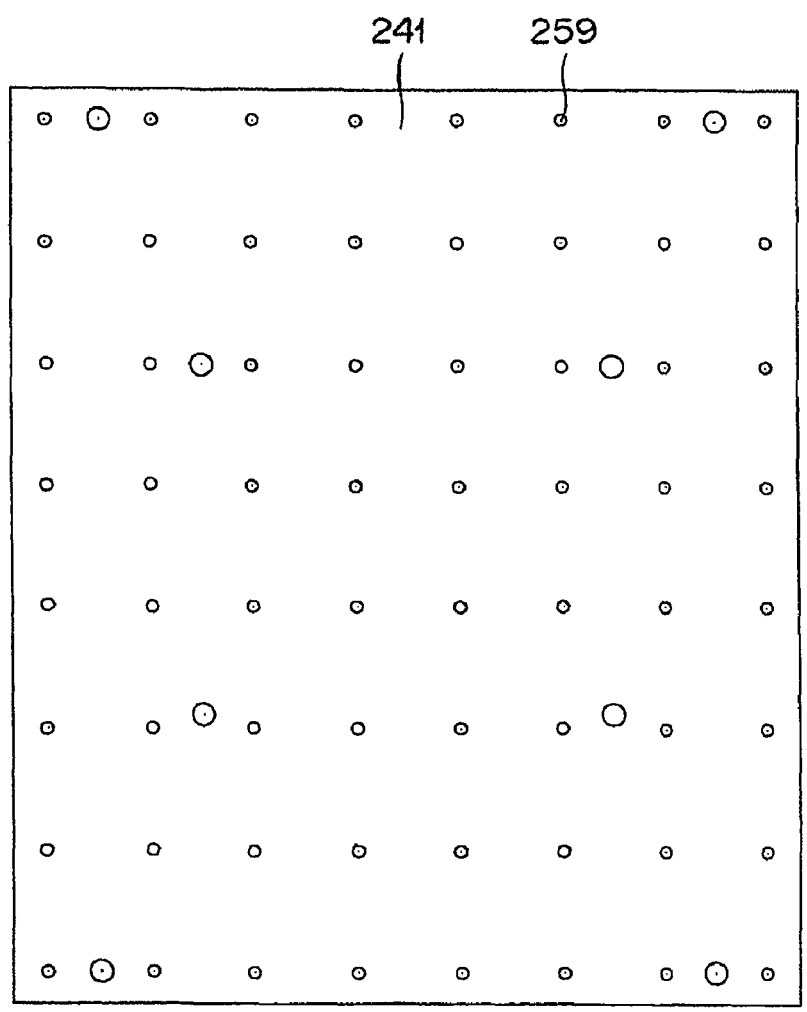
FIG. 34 is a front view of a separator suction portion taken along the line C-C shown in FIG. 32.
Figure 35:
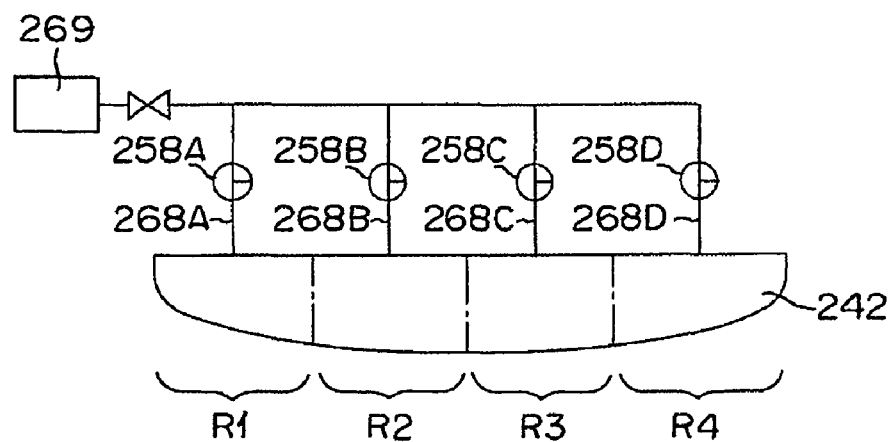
FIG. 35 is a conceptual view schematically illustrating the separator suction portion.
Figure 36:
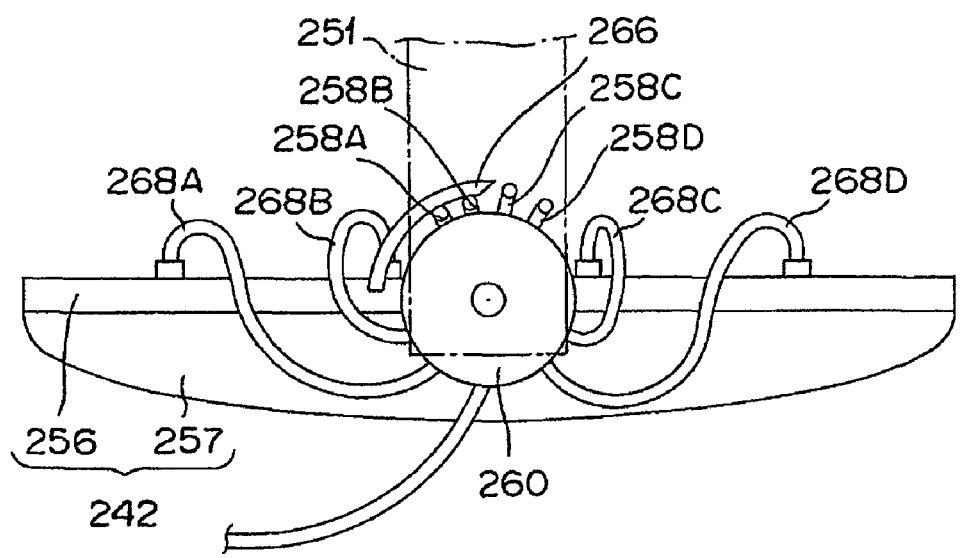
FIG. 36 is an enlarged side view of a surrounding of the separator suction portion of the separator arranging device of FIG. 30.
Figure 37A:
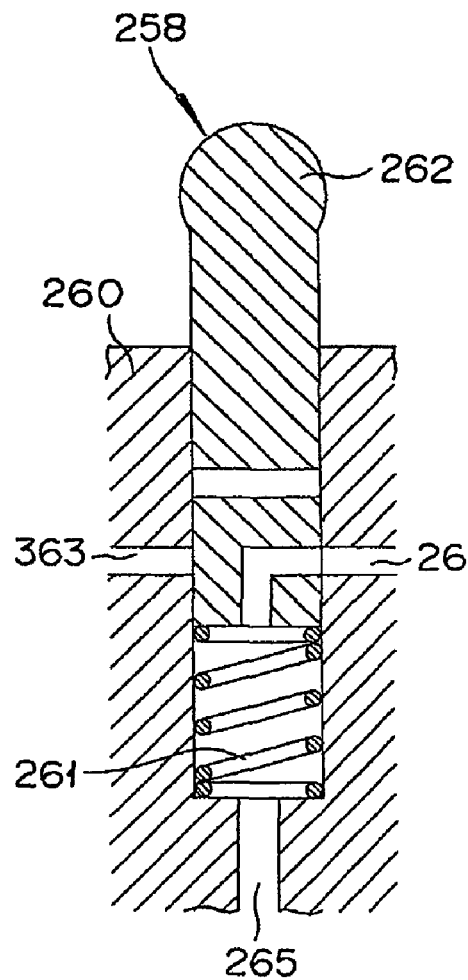
FIG. 37A is a cross-sectional view of a plunger valve when the valve is opened.
Figure 37B:
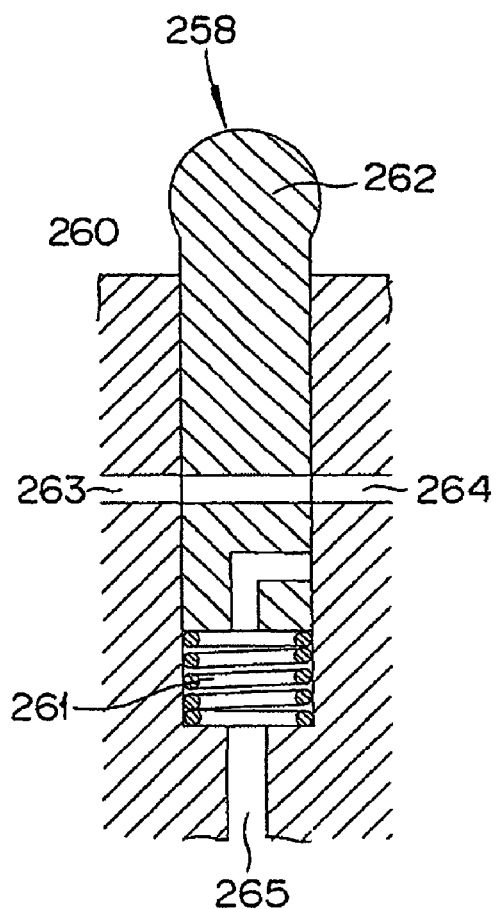
FIG. 37B is a cross-sectional view of the plunger valve when the valve is opened to the outside.
Figure 38:
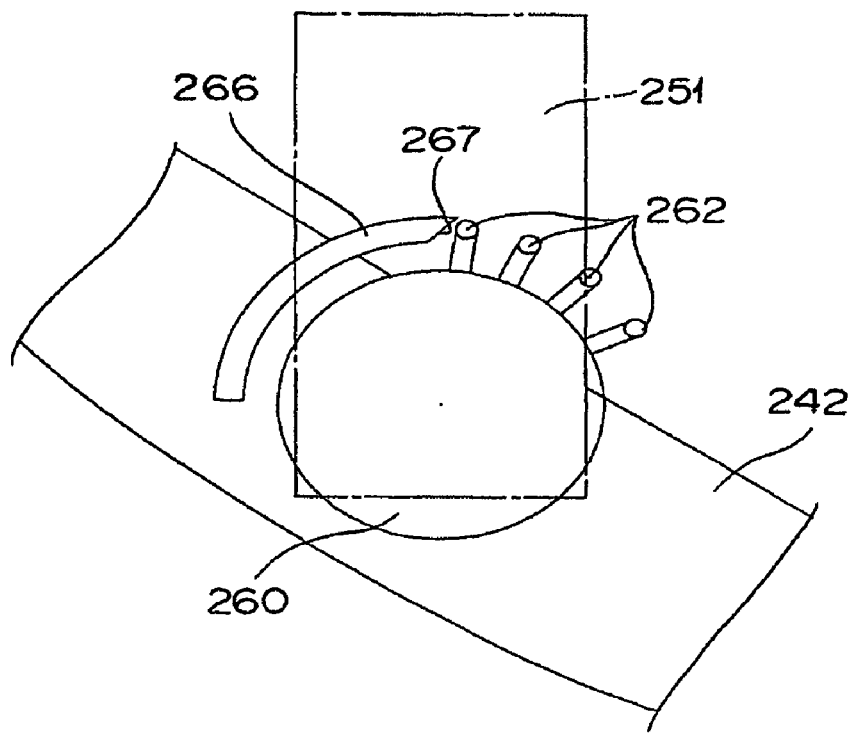
FIG. 38 is a partial side view of the separator suction portion when all the plunger valves are opened.
Figure 39:
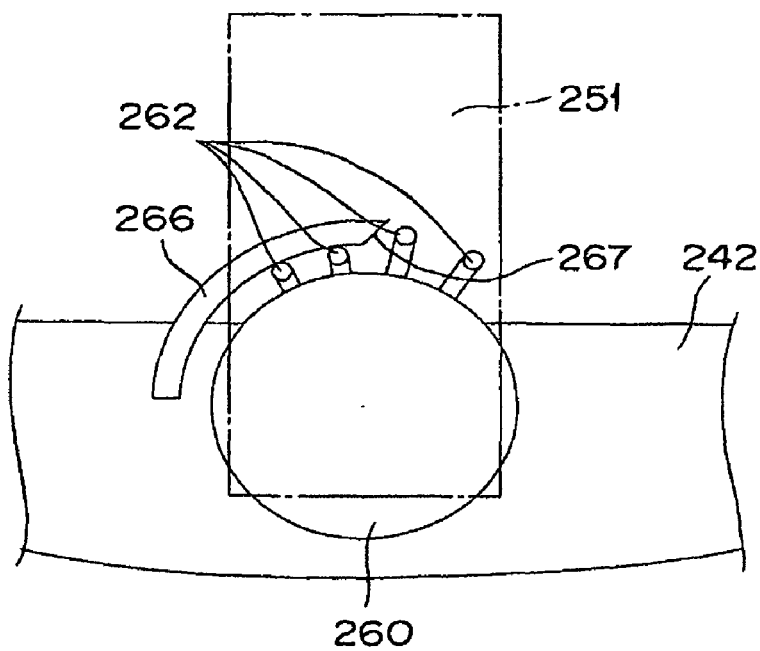
FIG. 39 is a partial side view of the separator suction portion when some of the plunger valves are opened.
Figure 40:
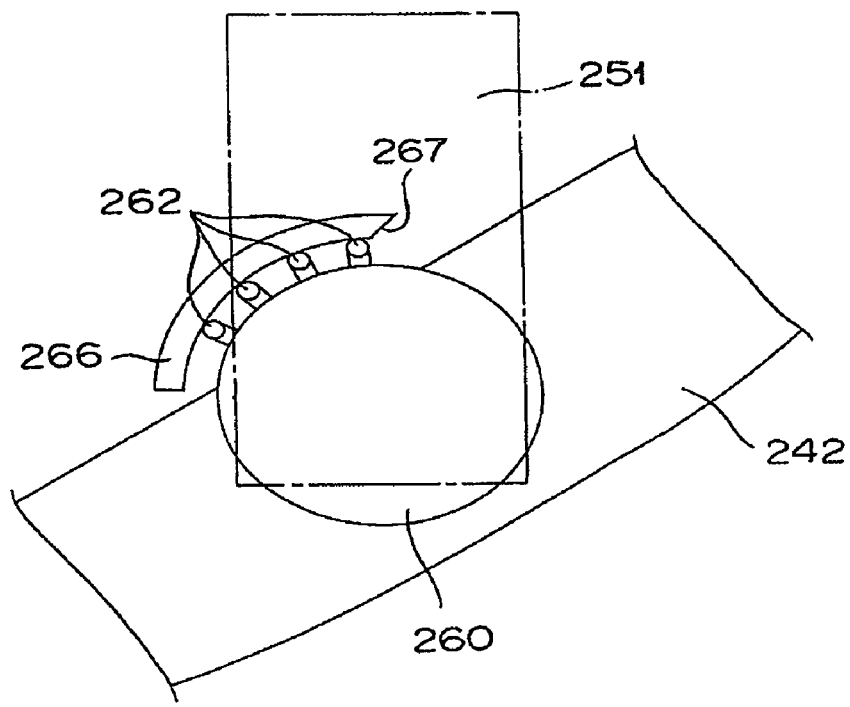
FIG. 40 is a partial side view of the separator suction portion when all the plunger valves are opened to the outside.
Figure 41:
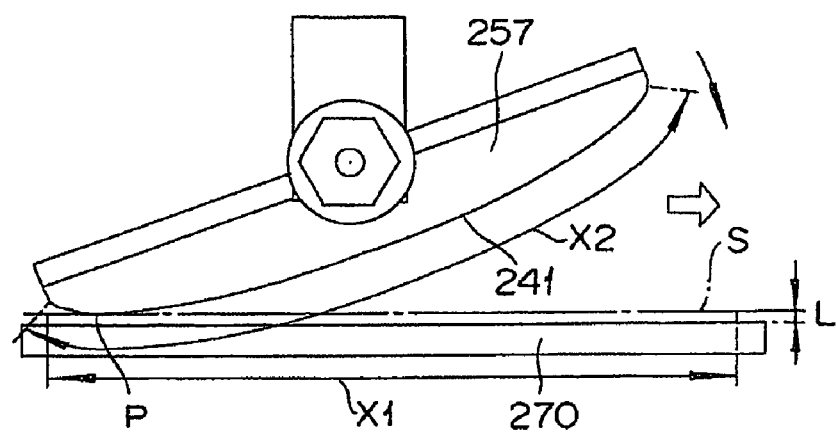
FIG. 41 is a side view of the separator suction portion when installing the separator.

FIG. 30 is a perspective view of the separator arranging device in accordance with the first embodiment, while FIG. 31 is a front view and FIG. 32 is a side view. FIG. 33 is a front view of the suction body portion taken along the line B-B shown in FIG. 32. FIG. 34 is a front view of the separator suction portion taken along the line C-C shown in FIG. 32. FIG. 35 is a conceptual view schematically illustrating the separator suction portion. FIG. 36 is an enlarged side view of the surroundings of the separator suction portion of the separator arranging device. FIG. 37A is a cross-sectional view of a plunger valve at a time when the valve is opened, and FIG. 37B is a cross-sectional view at the time when the valve is opened to the outside. FIG. 38 is a partial side view of the separator suction portion when all the plunger valves are opened, and FIG. 39 is a partial side view of the separator suction portion when some of the plunger valves are opened. FIG. 40 is a partial side view of the separator suction portion when all the plunger valves are opened to the outside. FIG. 41 is a side view of the separator suction portion when installing the separator.

The separator arranging device 240 in FIG. 30 is configured to arrange the separator 121 in the bipolar electrode 110 on which the electrolyte is applied. As shown in FIGS. 30 to 32, the separator arranging device 240 comprises a separator suction portion 242 for suctioning the separator 121 and having a separator suctioning surface 241 that is curved so as to protrude toward the pallet 270 on the conveyor 280. The separator arranging device 240 also includes a moving mechanism 243 for moving the separator suction portion 242 in a three-dimensional direction. Finally, the separator arranging device 240 includes a rotating mechanism 244 for rotating the separator suction portion 242. The separator arranging device 240 serves as a bubble exhausting mechanism.

The moving mechanism 243 shown in FIGS. 30 and 31 comprises a frame body 245 fixedly installed over the conveyor 280, a horizontal moving member 247 moveably installed in a guide rail 246 installed and extended on the frame body 245 along a horizontal direction intersecting with the conveyor 280, a lifting member 249 liftable by a cylinder 248 to which a guide installed in the horizontal moving member 247 is attached and a suction portion retaining member 251 moveable along a moving direction of the conveyor 280 by a servo linear actuator 250 installed in the lifting member 249. The suction portion retaining member 251 is provided with the separator suction portion 242, which is rotatable by a rotating shaft extended along a horizontal direction intersecting with the conveyor 280. By controlling the moving mechanism 243 by a controller, it is possible to freely move the separator suction portion 242 in a three-dimensional direction.

The rotating mechanism 244 is installed in the suction portion retaining member 251 and has a servo motor 253 connected to the separator suction portion 242 via the decelerator 252. By controlling the rotating mechanism 244 by a controller, it is possible to freely move the separator suction portion 242 around the rotating shaft.

The separator suction portion 242 comprises a suction body 256 having a flow path forming surface 255 shown in detail in FIG. 33 wherein an air flow path groove 254, which becomes a path for suctioning the air, is formed and has a curved portion 257. The curved portion 257 of the separator suction portion 242 forms the surface of the separator suction surface 241 opposite to the flow path forming surface 255 (see FIGS. 32 and 34). The air flow path groove 254 formed in the flow path forming surface 255 of the suction body 256 is divided into a plurality of suction areas R1 to R4 arranged in one direction, as shown in FIG. 35. As shown in FIG. 36, the air flow path groove 254 in each suction area R1 to R4 is connected to each separate plunger valve 258A, 258B, 258C and 258D via connecting tubes 268A, 268B, 268C and 268D. Therefore, the air suction groove 254 of each suction area R1 to R4 is capable of suctioning separately. Also, in this embodiment, although there are four suction areas R1 to R4, embodiments are not limited to this number of suction areas. Further, as the number of suction areas increases, a vacuum destroying area explained below can be more finely set.

The curved portion 257 has a curved shape, which is bent at both end sides of the arranging direction of the suction areas R1 to R4. A plurality of separator suction apertures 259 (see FIG. 34) are formed in the curved portion 257 wherein the apertures 259 penetrate from the flow path forming surface 255 (shown in FIG. 33) to the separator suction surface 241 (shown in FIG. 32). The separator suction apertures 259 are formed over substantially the entire surface of the separator suction surface 241 and have a diameter of 3 mm and a pitch of 20 mm. Each separator suction aperture 259 is communicated with the air flow path groove 254 of the suction body 256 (shown in FIG. 33). Further, optionally, it is possible to manufacture the curved portion 257 with a material having permeability such as a foamed porous resin or a foamed porous metal without forming the separator suction aperture 259 in the curved portion 257. Also, the flow path forming surface 255 may be curvedly formed so that a curved punching metal having a uniform plate thickness may be applied as the curved portion 257 installed in the flow path forming surface 255.

At a side along the arranging direction of the suction areas R1 to R4 of the separator suction portion 242, a cylindrical valve forming portion 260 is fixed wherein the valve is formed as shown in FIG. 36. The separator suction portion 242 and the valve forming portion 260 are rotatably connected to the suction portion retaining member 251.

At the valve forming portion 260, a slide moving portion 262 is installed as shown in FIGS. 37A and B. The slide moving portion 262 can move forward and backward along a diametrical direction and is pressed by a spring 261. When the slide moving portion 262 is protruded, a flow path 265 communicating with a vacuum pump 269 is connected to a flow path 264 communicating with the separator suction groove 259 by opening a valve (see FIG. 37A). When the slide moving portion 262 is pushed, a flow path 263 opened to the atmosphere is connected to the flow path 264 (see FIG. 37B). The plunger valves 258A to 258D are installed at each suction area R1 to R4. Each plunger valve 258A to 258D is arranged side by side along a peripheral direction in the same order as the suction areas R1 to R4.

At the suction portion retaining member 251 shown in FIG. 36, a pushing portion 266 is installed. The pushing portion 266 covers a desired angular range in the outer periphery of the valve forming portion 260 as shown in FIGS. 38 and 39. As the separator suction portion 242 is rotated, the pushing portion 266 is configured to push the slide moving portion 262 installed in the valve forming portion 260 by a taper portion 267 formed at an end and to retain the slide moving portion 262 as contacted.

When installing the separator 121, the separator 121 as fed by the separator feeding device 230 is suctioned and retained with a negative pressure generated in the separator suction portion 242. At this time, all the plunger valves 258 are opened, and the separator 121 is suctioned by all the suction areas R1 to R4.

As shown in FIG. 41, the curved portion 257 is rotated and moved over the bipolar battery 110 arranged on the pallet 270 along an arrangement direction of the suction areas R1 to R4 shown by the unlabeled arrow in FIG. 41. At this time, the curved portion 257 is moved along the arrangement direction of the suction areas R1 to R4 while a spaced surface S spaced apart from the pallet 270 in a desired distance L linearly contacts the separator suction surface 241. In such a case, a contact moving distance X1 is that in which a linearly contacted position P in the spaced surface S is moved along the arrangement direction of the suction areas R1 to R4. The contact moving distance X1 is equal to a separator contact length X2 of a linearly contacted area of the separator suction surface 241 along the arrangement direction of the suction areas R1 to R4. While a member fitted onto the pallet 270 is subjected to a sandwiching force from the separator suction surface 241 vertical to the pallet 270, the member is not subjected to a force horizontal to the pallet 270. Accordingly, the separator 121 is not offset from the pallet 270 and conveyor 280.

The desired distance L between the pallet 270 and the separator suction surface 242 is set such that the separator 121 retained by the separator suction surface 242 contacts the electrolyte applied to the bipolar electrode 110 installed on the pallet 270. Therefore, the separator 121 retained by the separator suction portion 242 contacts the electrolyte at a lowermost portion of the separator suction portion 241 (the nearest portion to the pallet 270) in a linear shape having a desired width.

Further, as shown in FIGS. 38 to 40, when installing the separator 121 the slide moving portion 262 of the plunger valves 258A to 258D is pushed one by one while the separator suction portion 242 is rotated. The suctioning is sequentially stopped from a suction area for suctioning a region contacting the electrolyte 124 of the separator, thereby releasing the vacuum. Then the electrolyte 124 of the separator 121 is moved to the bipolar electrode 110 side. As such, the separator 121 is linearly contacted with the electrode having a desired width at the lowermost portion of the separator suction surface 242, and the bubble N between the separator 121 and the electrolyte can be exhausted.

Even if the bubble N is introduced between the separator 121 and the electrolyte 124, a suctioning force is exerted from one side M1 of the separator 121 to another side M2 to thereby exhaust the bubble N via the separator 121 since the permeable separator 121 is suctioned by the separator suction portion 242 (see FIG. 1). At this time, the electrolyte 124 contacting the separator 121 densely penetrates into the separator by the suctioning force. As such, the introduction of the bubble N between the separator 121 and the electrolyte 124 is minimized, producing a bipolar battery 10 with improved battery performance. It should be noted that, when exhausting the bubble N, the separator 121 does not need to be tightly pulled by hand, thereby avoiding damage to the separator 121. The electrolyte can be densely penetrated into the separator 121, and the ion and current can efficiently flow when operating the battery, increasing the power density. Also, in this embodiment, the bipolar electrode 110 is suctioned and retained by the pallet 270 in the process of installing the separator 121. However, depending on conditions, it may not be necessary to suction.

Figure 42:
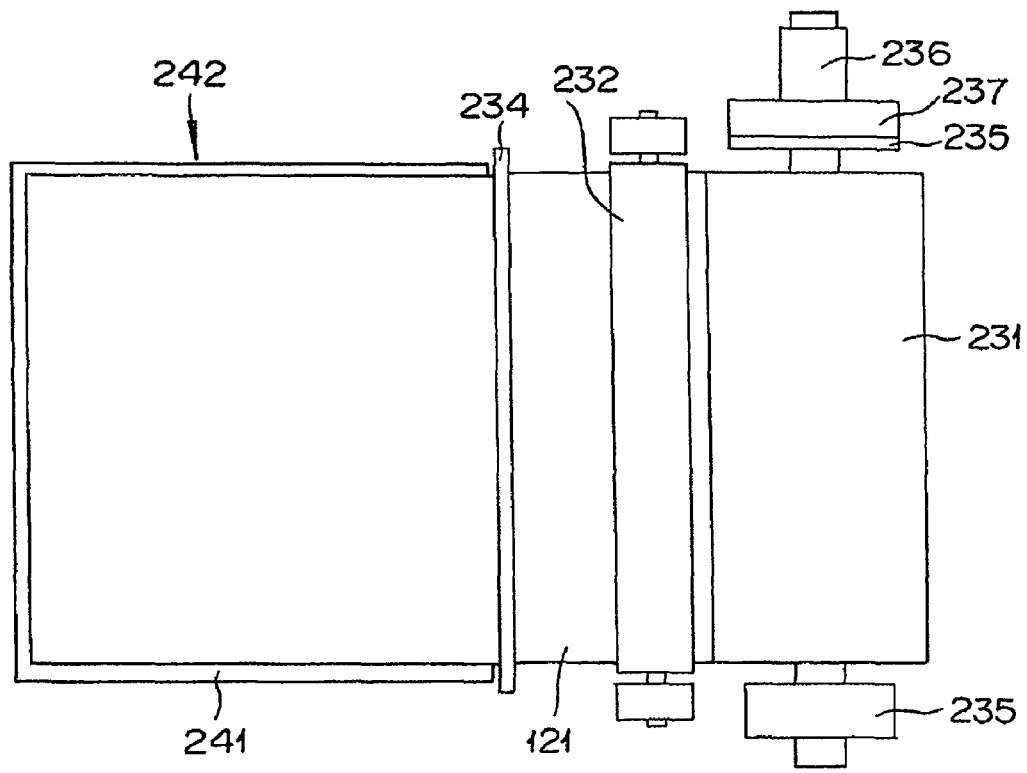
FIG. 42 is a front view of another example of the separator feeding device.
Figure 43:
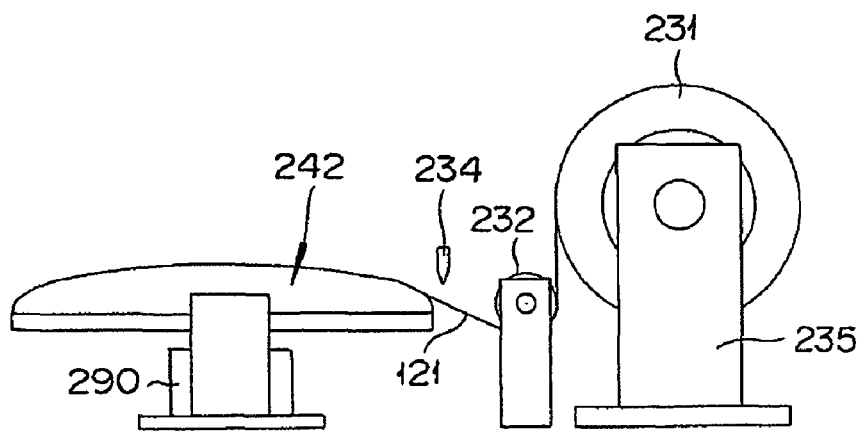
FIG. 43 is a side view of another example of the separator feeding device.

FIG. 42 is a front view and FIG. 43 is a side view of another example of the separator feeding device. Further, the members having the same function as the above explained separator suction device are denoted by the same reference numerals and an explanation thereof is omitted.

In an another example of the separator feeding device 230, the separator loading board 233 shown in FIGS. 28 and 29 may not be provided. Alternately, it is configured to directly load the separator 121 on the separator suction portion 242, which is retained by allowing the separator suction surface 241 to be a top surface, The separator suction portion 242 is retained and fixed in a separator suction portion fixing member 290. Then, the suction areas (such as R1 to R4 shown in FIG. 35) of the separator suction portion 242 are suctioned to retain the separator 121 on the separator suction surface 241. Thereafter, the separator suction portion 242 is inverted, and the separator suction portion 242 is fixed to the moving mechanism 243. Then, the separator is reinstalled.

Next, an apparatus for manufacturing the bipolar battery 300 constructed in accordance with a second embodiment is explained.

Figure 44:
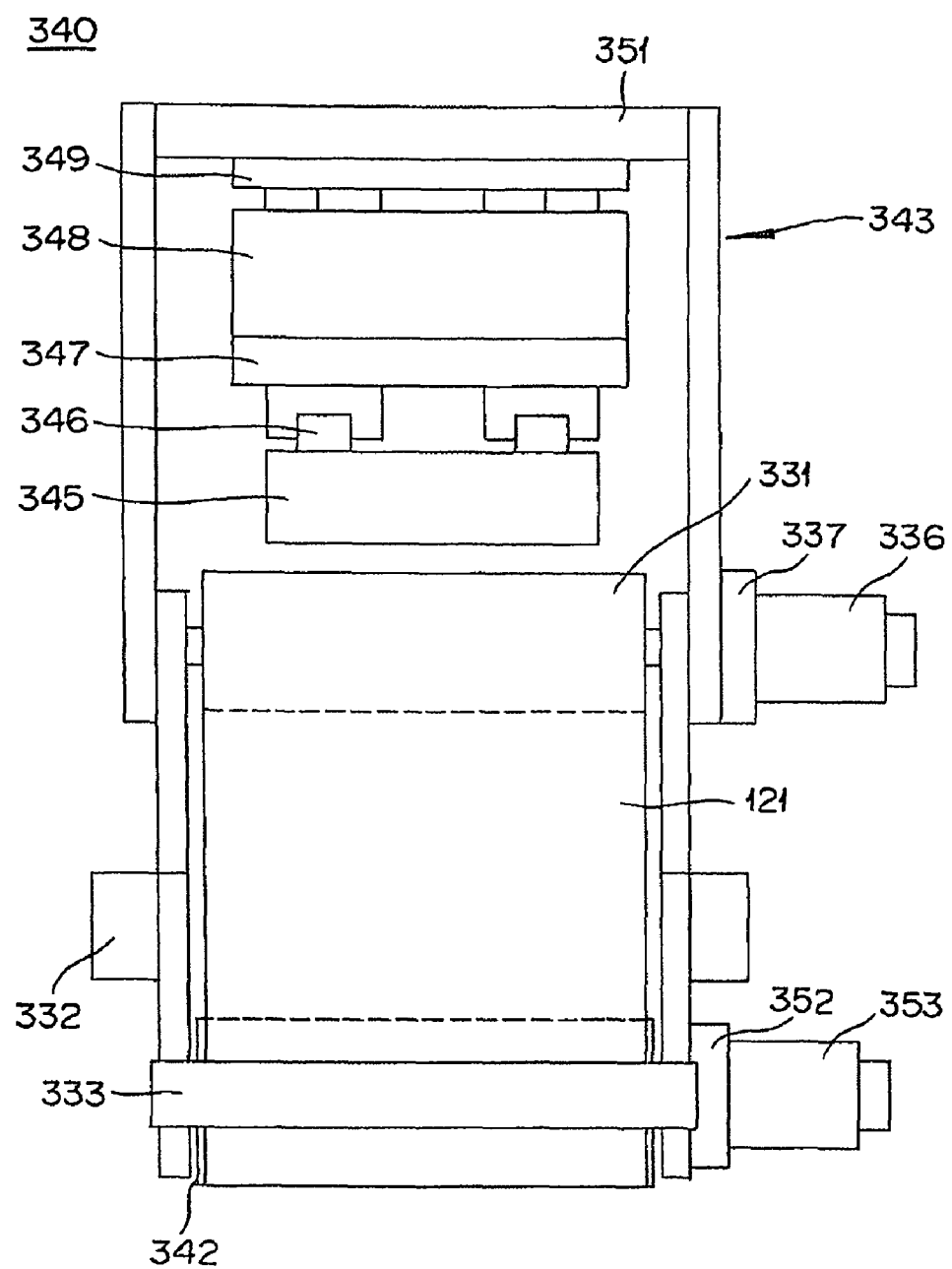
FIG. 44 is a front view of a separator arranging device of the apparatus for manufacturing the bipolar battery in accordance with a second embodiment of the present invention.
Figure 45:
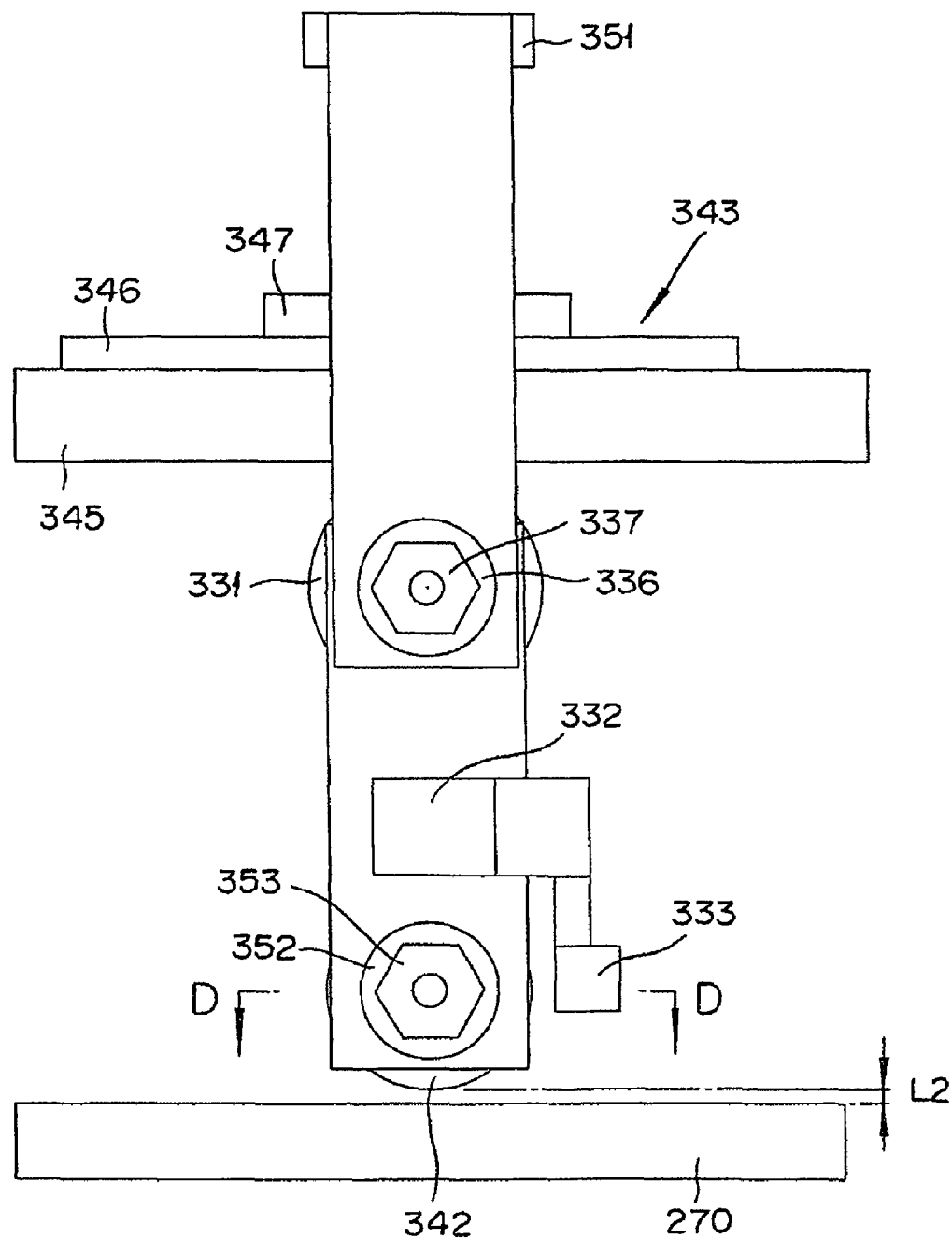
FIG. 45 is a side view of the separator arranging device.
Figure 46:
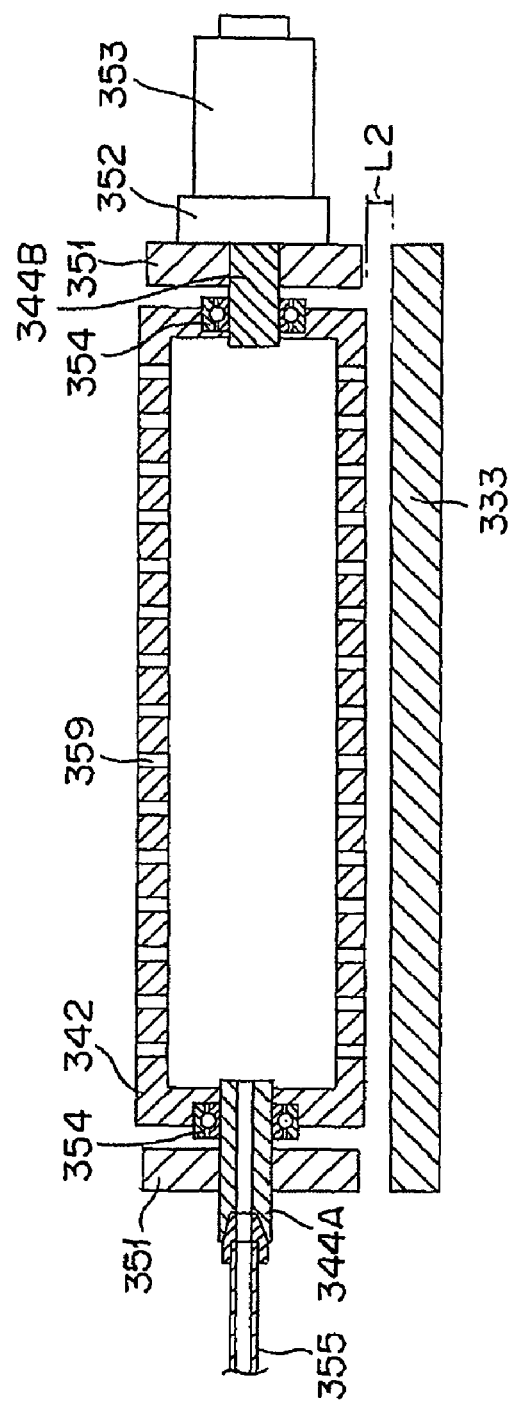
FIG. 46 is a cross-sectional view of a suction roller taken along the line D-D shown in FIG. 45.

FIG. 44 is a front view and FIG. 45 is a side view of a separator arranging device of the apparatus for manufacturing the bipolar battery of the second embodiment. FIG. 46 is a cross-sectional view of the suction roller taken along the line D-D shown in FIG. 45.

The apparatus for manufacturing the bipolar battery 300 of the second embodiment is different from the first embodiment in terms of a separator arranging device 340 used to arrange the separator material. Members having the same function as in the first embodiment are denoted by the same reference numerals and explanations thereof will be omitted.

As shown in FIGS. 44 and 45, the separator arranging device 340 of the second embodiment comprises a cylindrical suction roller 342 (separator suction portion) having a rotational axis parallel to the pallet 270, a separator roll 331 for feeding the separator 121 to the suction roller 342 and a moving mechanism 343 for moving the suction roller 342 to a two-dimensional direction. The separator arranging device 340 serves as a bubble exhausting mechanism.

The moving mechanism 343 comprises a frame body 345 extended over the conveyor 280 along a traveling direction of the conveyor 280, a horizontal moving member 347 moveably installed in a guide rail 346 extending along a traveling direction of the conveyor 280 in the frame body 345 and a lifting member 349 liftable by a surface pressure control cylinder 348 installed at the horizontal moving member 347. A suction portion retaining member 351 is fixed to the lifting member 349. The separator roll 331 and the suction roller 342 are connected to the suction portion retaining member 351. Accordingly, by controlling the moving mechanism 343 through a controller, the separator roll 331 and the suction roller 342 can be freely moved to two directions in an up-down direction and a traveling direction of the conveyor.

The separator roll 331 is rotatably installed in the suction portion retaining member 351 by a rotational shaft, which is extended along a horizontal direction intersecting with the conveyor 280. A servo motor 336 is connected to the separator roll 331 via a decelerator 337. The separator roll 331 can be rotated by controlling the servo motor 336 through a controller.

Further, a separator pressing portion 333 is installed in the suction portion retaining member 351. The separator pressing portion 333 is configured to fit the separator 121 between the separator pressing portion 333 and the suction roller 342, while closing and distancing away from the suction roller 342 by a separator pressing driving cylinder 332 fixed on the suction portion retaining member 351. When the separator 121 is fed from the separator roll 331, the separator pressing portion 333 is spaced away to allow the separator 121 to be moved. While the separator 121 is not fed, the separator 121 is fitted and retained between the suction roller 342 and the separator pressing portion 333.

The suction roller 342 is rotatably installed at the suction portion retaining member 351 by rotational shafts 344A and 344B shown in FIG. 46, which are extended along a horizontal direction intersecting with the conveyor 280. A servo motor 353 is connected to the suction roller via a decelerator 352. The suction roller 342 can be rotated by controlling the servo motor 353 through a controller.

As shown in FIG. 46, the suction roller 342 is connected to the rotational shafts 344A and 344B, which are fixed on the suction portion retaining member 351 via a bearing 354. One rotational shaft 344A is hollow and is connected to an air suction tube 355. The air suction tube communicates with an inside of the suction roller 342 at one end and with a vacuum pump via a valve at the other end.

A plurality of separator suction apertures 359 is formed in the suction roller 342. The plurality of separator suction apertures 359 penetrates from an inner surface to an outer surface of the suction roller 342 and can suction the air outside of the suction roller to the inside.

The suction roller 342 can be moved in parallel while retaining a desired distance L2 between the outer surface and the pallet 270 (see FIG. 45).

When installing the separator 121, a leading end of the separator 121 is first placed at an end of the bipolar electrode 110 and fixed using a clamp. Then, the suction roller 342 is arranged thereon. Thereafter, the suction roller 342 is rotated and moved while being suctioned by the suction roller 342. At this time, the moving distance of the suction roller 342 is equal to the total circumferential length of the rotated suction roller 342.

Here, the desired distance L2 between the pallet 270 and an outer peripheral surface of the suction roller 342 is set such that the separator 121 retained in the suction roller 342 is contacted with the electrolyte applied to the bipolar electrode 110 installed in the pallet 270. The separator 121 retained in the suction roller 342 linearly contacts the electrolyte at a lowermost portion of the suction roller 342, nearest the pallet 270, having a desired width. As such, the separator 121 linearly contacts the electrolyte 124 at the lowermost portion of the separator suction surface 241 having a desired width to thereby increase the contact area, restricting the introduction of a bubble N between the separator 121 and the electrolyte 124.

Even if a bubble N is introduced between the separator 121 and the electrolyte 124, the permeability of the separator 121 permits a suctioning force to be exerted from one side M1 of the separator 121 to another side M2 to thereby exhaust the bubble N (see FIG. 1). At this time, the electrolyte 124 contacting the separator 121 densely penetrates into the separator due to the suctioning force, further limiting bubble N formation between the separator 121 and the electrolyte 124 and improving the bipolar battery 10 performance. Further, there is no need to tightly pull the separator 121 by hand so as to remove the bubble N so the separator 121 will not be damaged, and the electrolyte can be densely penetrated into the separator 121. Further, the ion and current can efficiently flow when operating the battery, increasing the power density.

Since the separator roll 331 is installed in the separator arranging device 340 in the second embodiment, the separator feeding device 230 of the first embodiment is unnecessary.

Next, an apparatus for manufacturing the bipolar battery 400, which is constructed in accordance with a third embodiment, is explained below.

Figure 47:
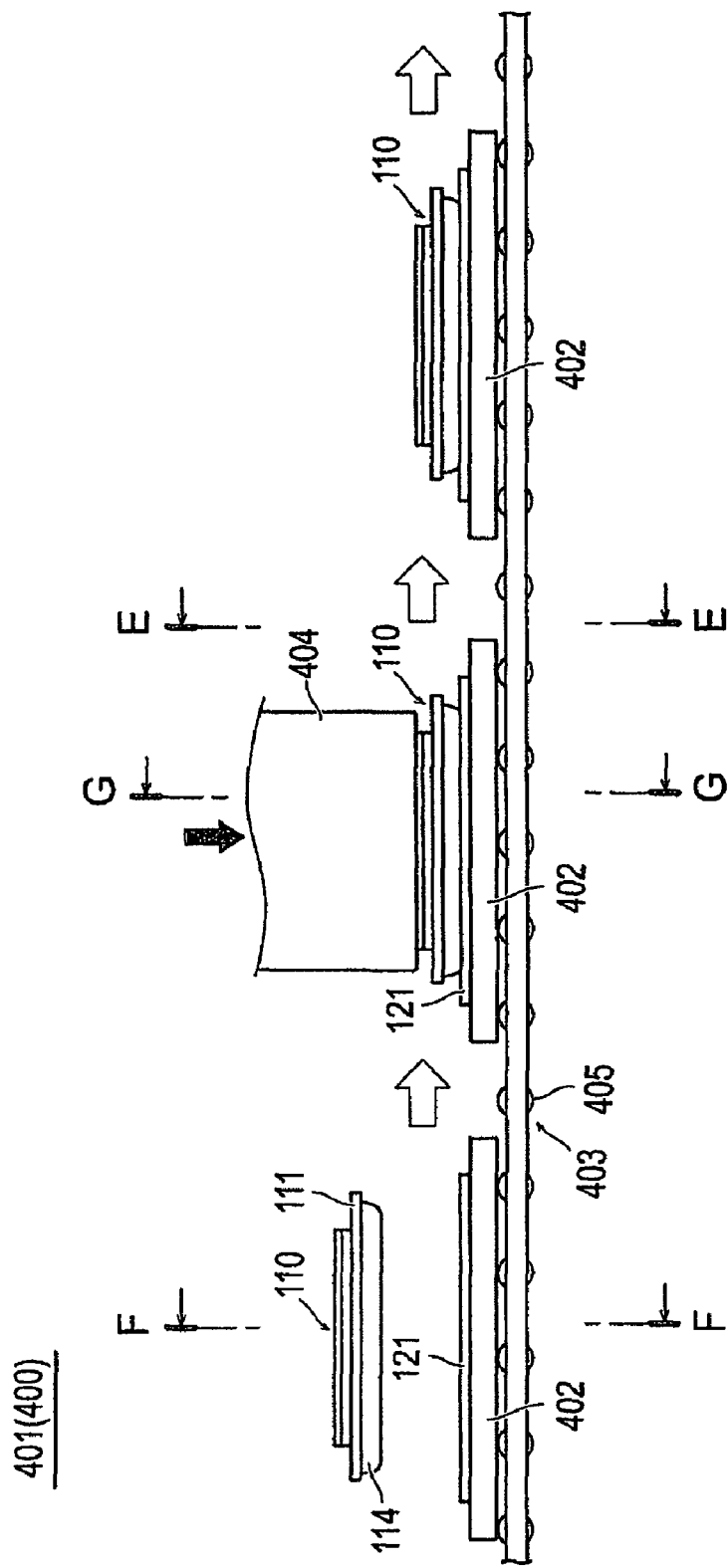
FIG. 47 is a side view of a separator arranging device of the apparatus for manufacturing the bipolar battery in accordance with a third embodiment of the present invention.
Figure 48:
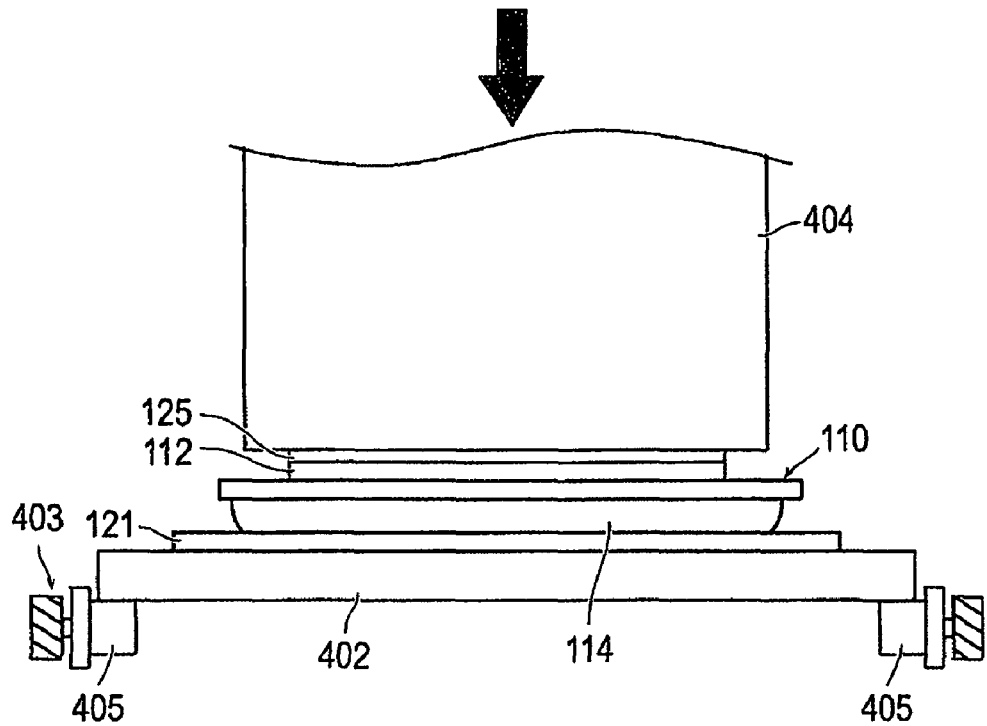
FIG. 48 is a cross-sectional view taken along the line E-E shown in FIG. 47.
Figure 49:
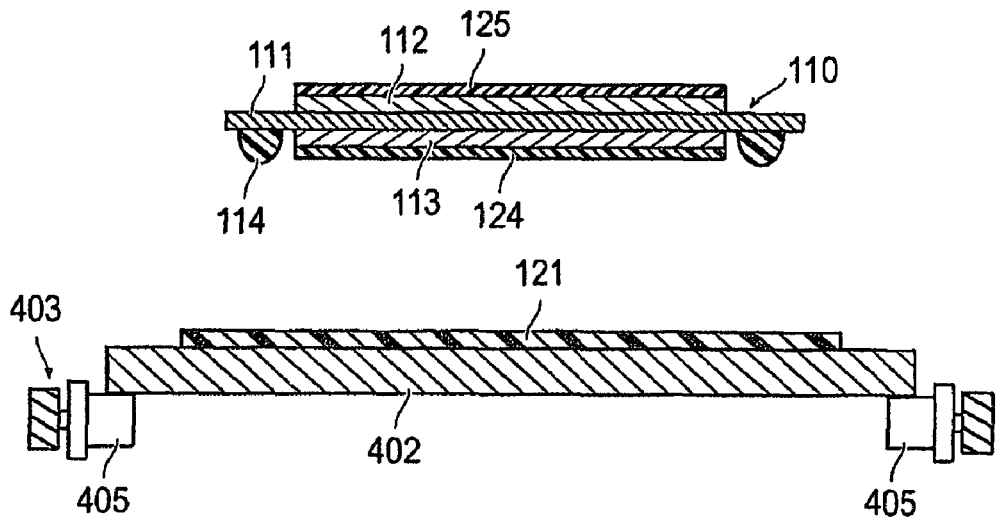
FIG. 49 is a cross-sectional view taken along the line F-F shown in FIG. 47.
Figure 50:
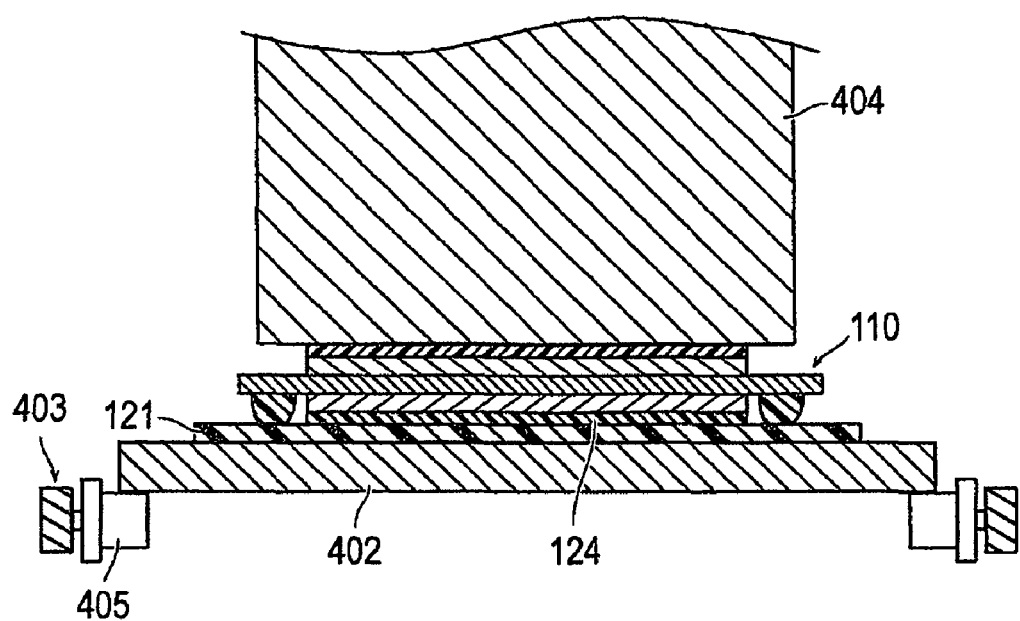
FIG. 50 is a cross-sectional view taken along the line G-G shown in FIG. 47.

FIG. 47 is a side view of a separator arranging device of an apparatus for manufacturing the bipolar battery of the third embodiment. FIG. 48 is a cross-sectional view taken along the line E-E shown in FIG. 47. FIG. 49 is a cross-sectional view taken along the line F-F shown in FIG. 47. FIG. 50 is a cross-sectional view taken along the line G-G shown in FIG. 47.

As shown in FIG. 47, the separator 121 is arranged on a separator retaining plate 402 and the bipolar electrode 110 is installed on the separator 121. In the first and second embodiments, the processes of arranging the electrolyte, the first sealing material, the separator material and the second sealing material are performed on the pallet 270 for every bipolar electrode 110. In the third embodiment, however, the process of arranging the separator material is performed on another separator retaining plate 402. The members having the same function as in the first and second embodiments are denoted by the same reference numerals and explanations thereof will be omitted.

As shown in FIGS. 47 to 50, a separator arranging device 401 of the third embodiment comprises a separator retaining plate 402 for retaining the separator 121, a conveyor for loading and conveying the separator retaining plate 402 and a pressing portion 404 installed at a desired position on the conveyor 403 and capable of pressing and moving away from the separator retaining plate 402 loaded on the conveyor 403. The separator arranging device 401 serves as a bubble exhausting mechanism.

The separator retaining plate 402 is a planar permeable plate and is formed from a punching metal, foamed porous resin or foamed porous metal. Convey rollers 405 are installed at the conveyor 403, wherein the convey rollers are connected to a motor so as to rotate. The separator retaining plate 402 can be conveyed by rotating the convey roller 405. The pressing portion 404 can press and move away from the separator retaining plate 402 loaded on the conveyor 403.

Next, a method of using the separator arranging device 401 constructed in accordance with the third embodiment is explained below. First, as shown in FIG. 47, the separator 121 is installed at the separator retaining plate 402 arranged on the conveyor 403. Then, the bipolar electrode 110 is overlapped with the separator 121 such that a side at which the first sealing material 114 is installed is contacted with the separator 121, wherein the electrolytes 124 and 125 are applied to both electrodes of the bipolar electrode 110 and the first sealing material 114 is applied to one side surface of the bipolar electrode 110. The arrangement of the separator 121 and the bipolar electrode 110 is performed by a robot or by hand.

After the convey roller 405 is driven to move the separator retaining plate 402 to a position wherein the pressing portion 404 is installed, the convey roller 405 is stopped. Thereafter, as shown in FIG. 50, the pressing portion 404 is driven to press the bipolar electrode 110 loaded on the separator retaining plate 402 against the separator 121. To this end, since the bubble N is pressed out from one side M1 toward another side M2 of the separator 121, and since the separator retaining plate 402 and the separator 121 have permeability, the bubble N within the electrolyte 124 and the separator 121 is exhausted to a fine aperture of the separator retaining plate 402 at an opposite side via the separator 121 (see FIG. 1). Further, at this time the electrolyte 124 contacting the separator 121 is penetrated into the separator 121 by a pressing force.

When pressing by the pressing portion 404, it is preferable in certain embodiments to adhere, for example, a PET film to the electrolyte 125 of the bipolar electrode 110 since the electrolyte 125 is also applied on a side contacting the pressing portion 404 of the bipolar electrode 110. Optionally, the electrolyte 125 may not be applied on a side contacting the pressing portion 404 of the bipolar electrode 110 when pressing. If this is so, the PET film is unnecessary.

The pressing portion 404 is driven by a cylinder, a motor or by hand. The pressing force is approximately 400 Pa, but is not specifically limited thereto. The bipolar electrode 110 is released from the pressing force by retracting the pressing portion 404. Then, the convey roller 405 is driven to export the bipolar electrode 110 to a next process, i.e., a process for arranging the second sealing material.

In the separator arranging device 401 of the third embodiment, the bubble N is pressed out from one side M1 to another side M2 of the separator 121 by a pressing operation rather than by a suctioning operation, thereby exhausting the bubble N through the separator 121 (see FIG. 1). Accordingly, since the introduction of the bubble N between the separator 121 and the electrolyte 124 can be prevented, a bipolar battery 10 with superior battery performance is manufactured. Further, when removing the bubble N, there is no need to tightly pull the separator 121 by hand so as to remove the bubble N. Thus, the separator 121 will not be damaged, and the electrolyte can be densely penetrated into the separator 121. Further, the ion and current can efficiently flow when operating the battery, increasing the power density. Also, since the separator 121, which has a poor handling feature, is previously arranged on the separator retaining plate 402 with the bipolar electrode 110, which has a good handling feature, the positioning workability is good. In addition, unlike the first and second embodiments, since the suction device is not necessary, a small scale facility can be used, thereby reducing the costs associated with the facility. A detaching connector such as a suction hose is also not required at the separator retaining plate, thereby decreasing failures and increasing reliability of the facility.

Next, an apparatus for manufacturing the bipolar battery 500, which is constructed in accordance with a fourth embodiment of the invention, is explained below.

Figure 51:
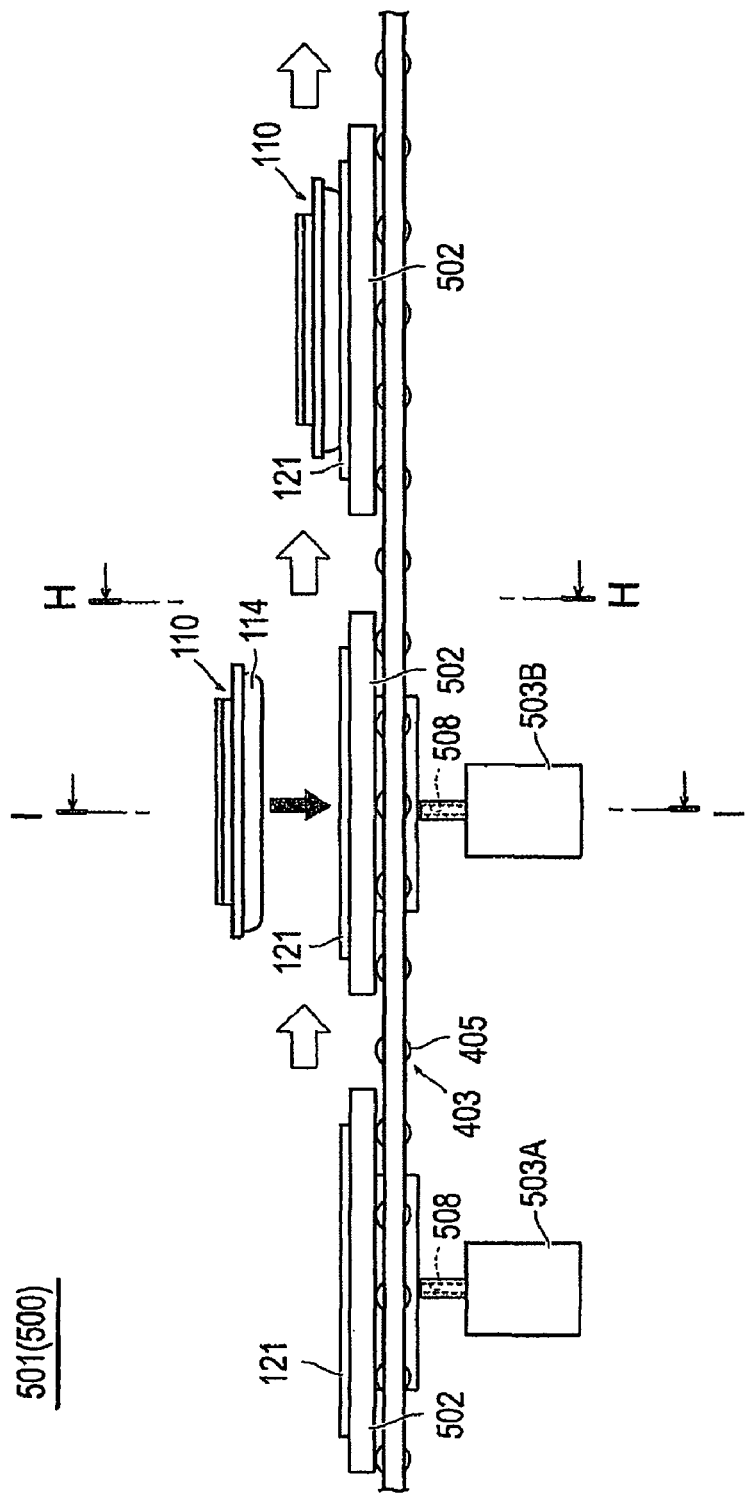
FIG. 51 is a side view of a separator arranging device of the apparatus for manufacturing the bipolar battery in accordance with a fourth embodiment of the present invention.
Figure 52:
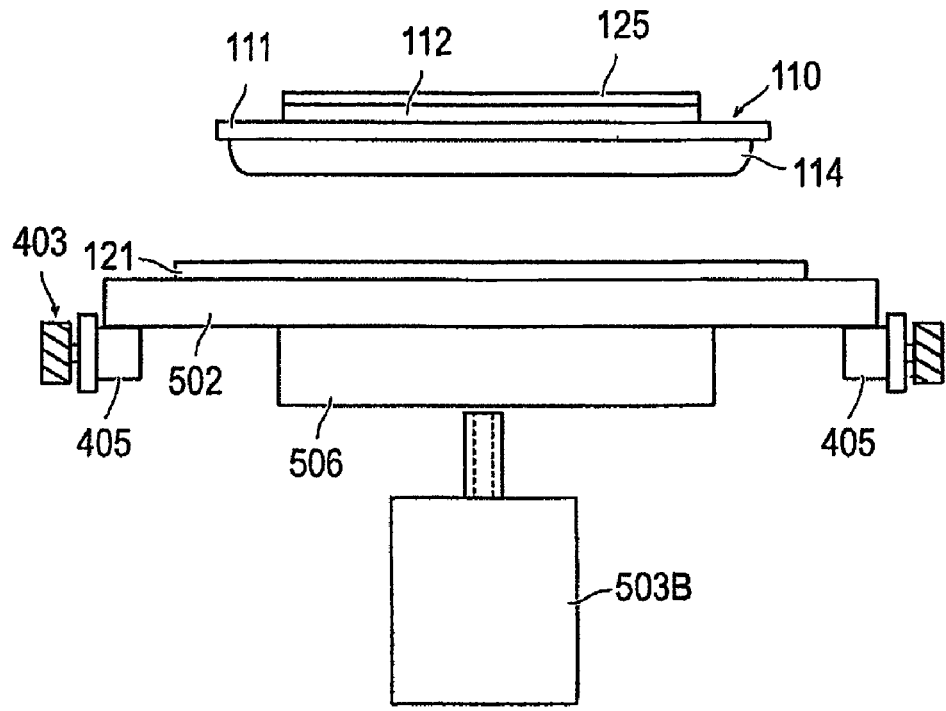
FIG. 52 is a cross-sectional view taken along the line H-H shown in FIG. 51.
Figure 53:
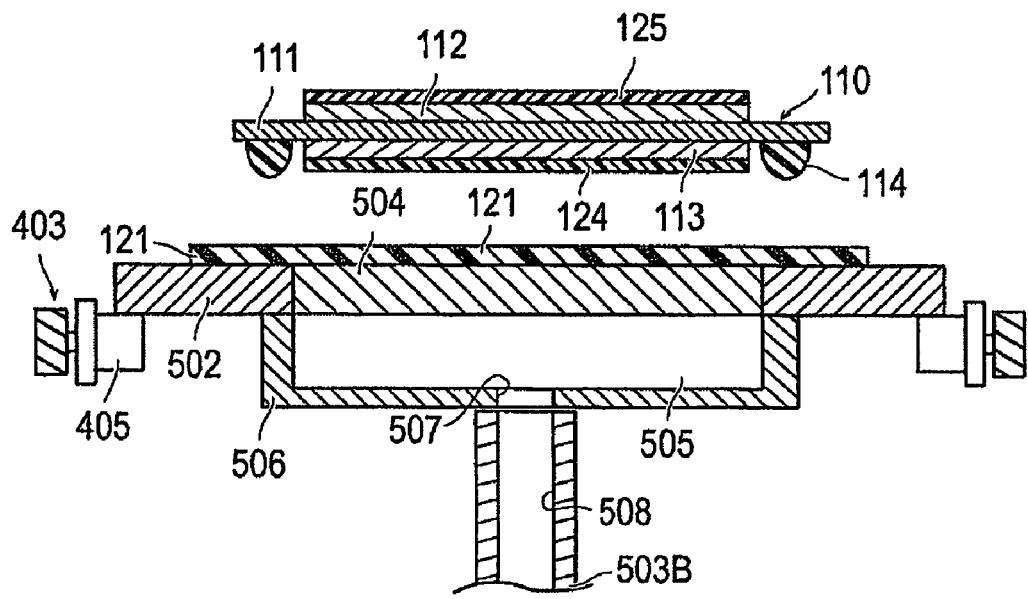
FIG. 53 is a cross-sectional view taken along the line I-I shown in FIG. 51.
Figure 54:
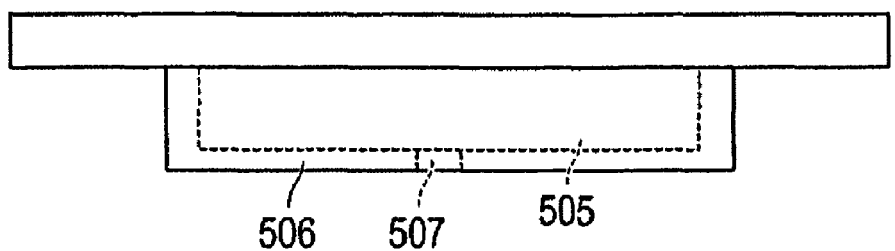
FIG. 54 is a side view of a separator retaining plate constructed in accordance with the fourth embodiment.

FIG. 51 is a side view of a separator arranging device of the apparatus for manufacturing the bipolar battery. FIG. 52 is a cross-sectional view taken along the line H-H shown in FIG. 51. FIG. 53 is a cross-sectional view taken along the line I-I shown in FIG. 51. FIG. 54 is a side view of a separator retaining plate of the fourth embodiment.

In the process of arranging the separator material of the first and second embodiments, the separator 121 is installed at the bipolar electrode 110 arranged in the pallet 270. However, in the process of arranging the separator material of the fourth embodiment, the separator 121 is arranged in a separator retaining plate 502 and the bipolar electrode 110 is installed at the separator 121 similar to the third embodiment. The members having the same function as in the first to third embodiments are denoted by the same reference numerals and explanations thereof will be omitted.

As shown in FIGS. 51 to 54, a separator arranging device 501 of the fourth embodiment comprises a separator retaining plate 502 for retaining the separator 121, a conveyor 403 for loading and conveying the separator retaining plate 502 and first and second negative pressure supplying portions 503A and 503B for supplying the negative pressure to the separator retaining plate 502. The separator arranging device 501 serves as a bubble exhausting mechanism.

A permeable venting portion 504 is formed on the separator retaining plate 502 in a center portion of a planar plate. An outer portion 506 is formed on one side surface of the separator retaining plate 502. The outer portion 506 is connected to the separator retaining plate 502 at an outer periphery of the venting portion 504 to form a suction space 505 between the outer portion 506 and the venting portion 504. A through-hole portion 507 is formed at the outer portion 506 in a position opposite to the venting portion 504. The venting portion is formed from a punching metal, foamed porous resin or foamed porous metal.

The first and second negative pressure supplying portions 503A and 503B are connected to a vacuum pump (not shown) via a three-way valve (not shown). They can supply the negative pressure from a negative pressure supply aperture 508, which is formed adjacent to a bottom surface of the separator retaining plate 502 installed at the conveyor 403. It is preferred, but not necessary, that the pallet 270 used in the first and second embodiments be employed as the separator retaining plate 502. It is also possible to use a permeable conveyor belt as the separator retaining plate 502.

Next, a method of using the separator arranging device 501 constructed in accordance with the fourth embodiment is explained. First, as shown in FIG. 51, the separator 121 is installed at the separator retaining plate 502 arranged at the conveyor 403. At this time, the through-hole portion 507 of the separator retaining plate 502 conforms to the negative pressure supplying aperture 508 of the first negative pressure supplying portion 503A. Then, the negative pressure is supplied to the suction space 505 via the first negative pressure supplying portion 503A. This is so that the negative pressure is generated at an outer side (the separator 121 side) of the venting portion 504, and the separator 121 is suctioned to the venting portion 504. To this end, a corrugation of the separator 121 can be elongated.

Next, the bipolar electrode 110 is contacted with the separator 121. This is so that a side at which the first sealing material 114 is provided is contacted with the separator 121. The electrolytes 124 and 125 are applied to both electrodes of the bipolar electrode 110, and the first sealing material 114 is applied to one side surface of the bipolar electrode 110. The arrangement of the separator 121 and the bipolar electrode 110 is performed by a robot or by hand.

Thereafter, the negative pressure is supplied to the suction space 505 by the second negative pressure supplying portion 503B via the through-hole portion 507. At this time, since the separator retaining plate 502 and the separator 121 are permeable, the bubble N within the electrolyte 124 and the separator 121 is suctioned and exhausted by the separator 121 and the venting portion 504 (see FIG. 1). At this time, the electrolyte 124 contacting the separator 121 densely penetrates into the separator 121. To securely exhaust the bubble N, it is effective to perform a roller operation from the bipolar electrode side or to press the bipolar electrode 110 against the separator 121 as in the third embodiment. Then, the convey roller 405 is driven to export to the next process, i.e., the process of arranging the second sealing material.

In the separator arranging device 501 constructed in accordance with the fourth embodiment, a suctioning force is exerted from one side M1 to another side M2 of the separator by suctioning the separator 121, rather than by pressing as in the third embodiment. This exhausts the bubble N through the separator 121. Therefore, since the introduction of the bubble N at an inner side of the separator 121 and the electrolyte 124 can be prevented, a bipolar battery 10 is provided with superior battery performance. Further, when exhausting the bubble N, there is no need to tightly pull the separator 121 by hand so as to remove the bubble N. Thus, the separator 121 will not be damaged. The electrolyte can be densely penetrated into the separator 121, and the ion and current can efficiently flow when operating the battery. Thus, it is possible to increase the power density. Further, it is possible to use a permeable belt conveyor wherein a suction space is formed at an inner peripheral side. This is so that the belt is used as the separator retaining plate.

While the embodiments of the invention are described above, it should be noted that the invention is not limited to those embodiments and may change or modify within a range of the appending claims. For example, in the embodiments, the order of stacking the first and second sealing materials 114 and 116 or the separator 121 is determined to prepare the assembly unit 108 shown in FIG. 14. However, the order or constitution of stacking operations is certainly not limited thereto. It may be preferable to apply a process of arranging the separator 121 in the cathode 113 or the anode 112 wherein the electrolytes 124 and 125 are applied.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of manufacturing a bipolar battery stack comprising:
    Preparing a first bipolar electrode by attaching a positive electrode and a negative electrode on opposite sides of a collector;
    Overlaying a first permeable separator on the first bipolar electrode with an electrolyte interposed there between to form a first sub-assembly;
    Preparing a second bipolar electrode by attaching a positive electrode and a negative electrode on opposite sides of a collector;
    Overlaying a second permeable separator on the second bipolar electrode with an electrolyte interposed there between to form a second subassembly;
    Stacking the first subassembly and the second subassembly to form at least a part of the bipolar battery stack and;
    Exhausting a gas bubble through the first permeable separator, the gas bubble formed between the first bipolar electrode on which the electrolyte is applied and the first permeable separator and exhausting a gas bubble through the second permeable separator, the gas bubble formed between the second bipolar electrode on which the electrolyte is applied and the second permeable separator, wherein exhausting the gas bubble can be performed individually before stacking or together after stacking but during the manufacturing of the battery.

2. The method according to claim 1, further comprising:
    penetrating the electrolyte into the first permeable separator and the second permeable separator during exhausting the gas bubble.

3. The method according to claim 1, further comprising:
    retaining one of the first permeable separator or the second permeable separator in a separator retaining plate configured to be permeable; and
    overlapping a corresponding bipolar electrode with the one of the first permeable separator or the second permeable separator, wherein exhausting the gas bubble comprises pressing the corresponding bipolar electrode against the one of the first permeable separator or the second permeable separator retained in the separator retaining plate.

4. The method according to claim 3 wherein pressing the corresponding bipolar electrode against the one of the first permeable separator or the second permeable separator comprises exerting a negative pressure from a back surface side of the separator retaining plate in which the one of the first permeable separator or the second permeable separator is retained.

5. The method according to claim 1, further comprising:
    suctioning and retaining one side surface of one of the first permeable separator or the second permeable separator with a separator suction portion;
    retaining a corresponding bipolar electrode on a conveyer, with the corresponding bipolar electrode configured with an electrolyte surface facing up; and
    overlaying a side surface of the one of the first permeable separator or the second permeable separator opposite the separator suction portion with the electrolyte surface;
    wherein exhausting the gas bubble comprises exerting a negative pressure with a suction device that provides suction to the separator suction portion on the one of the first permeable separator or the second permeable separator while overlaying.

6. The method according to claim 5 wherein the separator suction portion is configured on a moving mechanism positioned over the conveyer and configured to move linearly over the conveyer, and wherein the moving mechanism positions the separator suction portion with the one of the first permeable separator or the second permeable separator over the corresponding bipolar electrode in preparation of overlaying the one of the first permeable separator or the second permeable separator onto the electrolyte surface while exhausting the gas bubble.

7. The method according to claim 5 wherein the separator suction portion has a separator suction surface having a plurality of suction apertures in communication with the suction device and being curved in a moving direction of the conveyor, and wherein exhausting the gas bubble further comprises:
rotating the separator suction surface along the curve with a rotating mechanism configured on the separator suction portion while exerting the negative pressure with the suction device.

8. The method according to claim 7 wherein the plurality of suction apertures is formed in a plurality of suction areas along the moving direction of the conveyor; and wherein exhausting the gas bubble further comprises:
suctioning via the suction areas depending on a rotational angle of the separator suction surface.

9. The method according to claim 1, further comprising:
suctioning one side surface of the one of the first permeable separator or the second permeable separator with a separator suction portion, wherein the separator suction portion is a suction roller having an inner space in communication with a suction device, the suction roller having a plurality of suction apertures through which the suction device suctions the one of the first permeable separator or the second permeable separator;
retaining a corresponding bipolar electrode on a conveyer, the corresponding bipolar electrode configured with an electrolyte surface facing up; and
overlaying a side surface of the one of the first permeable separator or the second permeable separator opposite the separator suction portion with the electrolyte surface; and
wherein exhausting the gas bubble comprises exerting a negative pressure with the suction roller on the one of the first permeable separator or the second permeable separator while overlaying.

10. The method according to claim 1 wherein each of the first and second bipolar electrode comprises a cathode formed on one side of the collector and an anode formed on an opposite side of the collector, and wherein the electrolyte is a polymer gel electrolyte or an electrolytic solution; the method further comprising:
arranging a charging material in a space between the collector and a corresponding separator so as to surround the cathode and the anode.

11. A method of manufacturing a bipolar battery, the battery comprising a bipolar electrode on which an electrolyte is applied, the method comprising:
exhausting a gas bubble formed between the bipolar electrode and a permeable separator;
suctioning and retaining one side surface of the separator with a separator suction portion;
retaining the bipolar electrode on a conveyer, with the bipolar electrode configured with an electrolyte surface facing up; and
overlaying a side surface of the separator opposite the separator suction portion with the electrolyte surface, wherein:
exhausting the gas bubble comprises exerting a negative pressure with a suction device that provides suction to the separator suction portion on the separator while overlaying,
the separator suction portion is configured on a moving mechanism positioned over the conveyer and configured to move linearly over the conveyer, and
the moving mechanism positions the separator suction portion with the separator over the bipolar electrode in preparation of overlaying the separator onto the electrolyte surface while exhausting the gas bubble.

12. A method of manufacturing a bipolar battery, the battery comprising a bipolar electrode on which an electrolyte is applied, the method comprising:
exhausting a gas bubble formed between the bipolar electrode and a permeable separator;
suctioning and retaining one side surface of the separator with a separator suction portion;
retaining the bipolar electrode on a conveyer, with the bipolar electrode configured with an electrolyte surface facing up; and
overlaying a side surface of the separator opposite the separator suction portion with the electrolyte surface; wherein exhausting the gas bubble comprises exerting a negative pressure with a suction device that provides suction to the separator suction portion on the separator while overlaying, wherein:
the separator suction portion has a separator suction surface having a plurality of suction apertures in communication with the suction device and being curved in a moving direction of the conveyor, and
exhausting the gas bubble further comprises rotating the separator suction surface along the curve with a rotating mechanism configured on the separator suction portion while exerting the negative pressure with the suction device.

13. The method according to claim 12 wherein the plurality of suction apertures is formed in a plurality of suction areas along the moving direction of the conveyor; and wherein exhausting the gas bubble further comprises:
suctioning via the suction areas depending on a rotational angle of the separator suction surface.

14. A method of manufacturing a bipolar battery, the battery comprising a bipolar electrode on which an electrolyte is applied, the method comprising:
suctioning one side surface of a separator with a separator suction portion, wherein the separator suction portion is a suction roller having an inner space in communication with a suction device, the suction roller having a plurality of suction apertures through which the suction device suctions the separator;
retaining the bipolar electrode on a conveyer, the bipolar electrode configured with an electrolyte surface facing up; and
overlaying a side surface of the separator opposite the separator suction portion with the electrolyte surface; and
exhausting a gas bubble formed between the bipolar electrode and an overlaid permeable separator by exerting a negative pressure with the suction roller on the separator while overlaying.

* * * * *